US012308662B2

(12) United States Patent
Wang et al.

(10) Patent No.: US 12,308,662 B2
(45) Date of Patent: May 20, 2025

(54) TECHNIQUES FOR ENERGY HARVESTING USING A SQUARE WAVEFORM

(71) Applicant: QUALCOMM Incorporated, San Diego, CA (US)

(72) Inventors: Xiaojie Wang, Hillsborough, NJ (US); Jing Sun, San Diego, CA (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 18/160,451

(22) Filed: Jan. 27, 2023

(65) Prior Publication Data
US 2024/0258832 A1    Aug. 1, 2024

(51) Int. Cl.
*H02J 50/20*    (2016.01)
*H02J 50/80*    (2016.01)

(52) U.S. Cl.
CPC .............. *H02J 50/20* (2016.02); *H02J 50/80* (2016.02)

(58) Field of Classification Search
CPC .......... H02J 50/20; H02J 50/80; H02J 50/001; H04B 5/79
USPC ......................................................... 307/104
See application file for complete search history.

(56) References Cited

U.S. PATENT DOCUMENTS

| 2009/0174263 | A1  | 7/2009  | Baarman et al. |
| 2015/0108847 | A1  | 4/2015  | Taylor et al. |
| 2021/0194285 | A1* | 6/2021  | Park ........................ H02J 50/80 |
| 2022/0376555 | A1  | 11/2022 | Landis et al. |

OTHER PUBLICATIONS

Boaventura A., et al., "Boosting the Efficiency", Unconventional Waveform Design for Efficient Wireless Power Transfer, IEEE Microwave Magazine, IEEEService Center, Piscataway, NJ, US, vol. 16, No. 3, Apr. 1, 2015, XP011574313, pp. 87-96, p. 87, abstract, pp. 88-96.
International Search Report and Written Opinion—PCT/US2023/085374—ISA/EPO—Jun. 7, 2024.

* cited by examiner

*Primary Examiner* — Richard Tan
(74) *Attorney, Agent, or Firm* — Holland & Hart LLP

(57) ABSTRACT

Methods, systems, and devices for wireless communications are described. An energy harvesting device, such as a user equipment (UE) or a radio frequency identification (RFID) tag, may receive, from an energy transfer device such as a network node, an energy harvesting signal providing power for the energy harvesting device. The energy harvesting device may transmit, based on the energy harvesting signal, a control message indicating one or more parameters for a square waveform for energy harvesting, a requested duty cycle for the square waveform, or both. The energy harvesting device may receive the square waveform in response to the control message.

30 Claims, 16 Drawing Sheets

TECHNIQUES FOR ENERGY HARVESTING USING A SQUARE WAVEFORM

FIELD OF TECHNOLOGY

The present disclosure relates to wireless communications, including techniques for energy harvesting using a square waveform.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, wireless devices may communicate with one another via energy harvesting and backscatter communication. A wireless device may harvest energy from received signals and may use the harvested energy to perform backscattered transmissions.

SUMMARY

The described techniques relate to improved methods, systems, devices, and apparatuses that support techniques for energy harvesting using a square waveform. For example, the described techniques provide for an energy transfer device to use a square waveform when transmitting a wireless power transfer signal to an energy harvesting device. An energy transfer device may use a different duty cycle for different energy harvesting devices to provide efficient energy harvesting at the different energy harvesting devices. In some examples, an energy harvesting device may report one or more parameters associated with a square waveform for energy harvesting. For example, the energy harvesting device may report an optimal or requested duty cycle, characteristics of one or more sensitivity curves associated with a respective duty cycle or a respective input power level, a saturation duty cycle, or any combination thereof. In some examples, the energy harvesting device may report the one or more parameters to the energy transfer device. The energy transfer device may transmit, to the energy harvesting device, a square waveform for energy harvesting in accordance with the one or more parameters.

A method for wireless communications at an energy harvesting device is described. The method may include receiving, from a network node, an energy harvesting signal providing power for the energy harvesting device, transmitting, based on the energy harvesting signal, a control message indicating one or more parameters for a square waveform for energy harvesting, a requested duty cycle for the square waveform, or both, and receiving the square waveform in response to the control message.

An apparatus for wireless communications at an energy harvesting device is described. The apparatus may include a processor, memory coupled with the processor, and instructions stored in the memory. The instructions may be executable by the processor to cause the apparatus to receive, from a network node, an energy harvesting signal providing power for the energy harvesting device, transmit, based on the energy harvesting signal, a control message indicating one or more parameters for a square waveform for energy harvesting, a requested duty cycle for the square waveform, or both, and receive the square waveform in response to the control message.

Another apparatus for wireless communications at an energy harvesting device is described. The apparatus may include means for receiving, from a network node, an energy harvesting signal providing power for the energy harvesting device, means for transmitting, based on the energy harvesting signal, a control message indicating one or more parameters for a square waveform for energy harvesting, a requested duty cycle for the square waveform, or both, and means for receiving the square waveform in response to the control message.

A non-transitory computer-readable medium storing code for wireless communications at an energy harvesting device is described. The code may include instructions executable by a processor to receive, from a network node, an energy harvesting signal providing power for the energy harvesting device, transmit, based on the energy harvesting signal, a control message indicating one or more parameters for a square waveform for energy harvesting, a requested duty cycle for the square waveform, or both, and receive the square waveform in response to the control message.

In some examples of the method, apparatuses, and non-transitory computer-readable medium described herein, transmitting the control message may include operations, features, means, or instructions for transmitting the control message that indicates the one or more parameters that identify one or more sensitivity response curves for a set of multiple different square waveforms, each square waveform of the set of multiple different square waveforms having a respective duty cycle of a set of multiple different duty cycles.

In some examples of the method, apparatuses, and non-transitory computer-readable medium described herein, transmitting the control message may include operations, features, means, or instructions for transmitting the control message that indicates the one or more parameters that identify one or more sensitivity response curves for a set of multiple different square waveforms, each square waveform of the set of multiple different square waveforms associated with a respective input power level of a set of multiple different input power levels.

In some examples of the method, apparatuses, and non-transitory computer-readable medium described herein, receiving the square waveform may include operations, features, means, or instructions for receiving the square waveform with a first power during a first duration of the requested duty cycle and receiving the square waveform with a second power during a second duration the requested duty cycle, where the second power may be less than the first power and non-zero.

In some examples of the method, apparatuses, and non-transitory computer-readable medium described herein, the requested duty cycle indicates the first duration and the second duration.

Some examples of the method, apparatuses, and non-transitory computer-readable medium described herein may further include operations, features, means, or instructions for receiving a request to report the control message indicating at least the requested duty cycle, the one or more parameters, or both, where transmitting the control message may be in response to the request.

In some examples of the method, apparatuses, and non-transitory computer-readable medium described herein, the energy harvesting signal includes a request to report the requested duty cycle, the one or more parameters, or both and transmitting the control message may be in response to the request.

In some examples of the method, apparatuses, and non-transitory computer-readable medium described herein, the one or more parameters indicate an average activation power of the energy harvesting device, the requested duty cycle for the square waveform associated with the average activation power of the energy harvesting device, a slope of sensitivity to duty cycle, a saturation duty cycle, one or more characteristics of a rectifier of the energy harvesting device, or any combination thereof.

In some examples of the method, apparatuses, and non-transitory computer-readable medium described herein, receiving the energy harvesting signal may include operations, features, means, or instructions for receiving a second square waveform in accordance with a second set of parameters, where transmitting the control message may be based on receiving the second square waveform.

Some examples of the method, apparatuses, and non-transitory computer-readable medium described herein may further include operations, features, means, or instructions for transmitting, via backscattering, a packet including information in response to the square waveform.

In some examples of the method, apparatuses, and non-transitory computer-readable medium described herein, the control message indicates a set of parameters for each of one or more sensitivity response curves associated with a respective one or more square waveforms, each square waveform of the respective one or more square waveforms having a respective duty cycle or a respective input power level, or both.

A method for wireless communications at a network node is described. The method may include transmitting an energy harvesting signal providing power for one or more energy harvesting devices, receiving, based on the energy harvesting signal, a control message indicating one or more parameters for a square waveform for energy harvesting, a requested duty cycle for the square waveform, or both, and transmitting the square waveform for energy harvesting in accordance with the one or more parameters, the requested duty cycle, or both.

An apparatus for wireless communications at a network node is described. The apparatus may include a processor, memory coupled with the processor, and instructions stored in the memory. The instructions may be executable by the processor to cause the apparatus to transmit an energy harvesting signal providing power for one or more energy harvesting devices, receive, based on the energy harvesting signal, a control message indicating one or more parameters for a square waveform for energy harvesting, a requested duty cycle for the square waveform, or both, and transmit the square waveform for energy harvesting in accordance with the one or more parameters, the requested duty cycle, or both.

Another apparatus for wireless communications at a network node is described. The apparatus may include means for transmitting an energy harvesting signal providing power for one or more energy harvesting devices, means for receiving, based on the energy harvesting signal, a control message indicating one or more parameters for a square waveform for energy harvesting, a requested duty cycle for the square waveform, or both, and means for transmitting the square waveform for energy harvesting in accordance with the one or more parameters, the requested duty cycle, or both.

A non-transitory computer-readable medium storing code for wireless communications at a network node is described. The code may include instructions executable by a processor to transmit an energy harvesting signal providing power for one or more energy harvesting devices, receive, based on the energy harvesting signal, a control message indicating one or more parameters for a square waveform for energy harvesting, a requested duty cycle for the square waveform, or both, and transmit the square waveform for energy harvesting in accordance with the one or more parameters, the requested duty cycle, or both.

In some examples of the method, apparatuses, and non-transitory computer-readable medium described herein, receiving the control message may include operations, features, means, or instructions for receiving the control message that indicates the one or more parameters that identify one or more sensitivity response curves for a set of multiple different square waveforms, each square waveform of the set of multiple different square waveforms having a respective duty cycle of a set of multiple different duty cycles.

In some examples of the method, apparatuses, and non-transitory computer-readable medium described herein, receiving the control message may include operations, features, means, or instructions for receiving the control message that indicates the one or more parameters that identify one or more sensitivity response curves for a set of multiple different square waveforms, each square waveform of the set of multiple different square waveforms associated with a respective input power level of a set of multiple different input power levels.

Some examples of the method, apparatuses, and non-transitory computer-readable medium described herein may further include operations, features, means, or instructions for transmitting a request for the control message indicating at least the requested duty cycle, the one or more parameters, or both, where the control message may be in response to the request.

In some examples of the method, apparatuses, and non-transitory computer-readable medium described herein, transmitting the square waveform may include operations, features, means, or instructions for transmitting the square waveform with a first power during a first duration of the requested duty cycle and transmitting the square waveform with a second power during a second duration of the requested duty cycle, where the second power may be less than the first power and non-zero.

In some examples of the method, apparatuses, and non-transitory computer-readable medium described herein, the requested duty cycle indicates the first duration and the second duration.

In some examples of the method, apparatuses, and non-transitory computer-readable medium described herein, transmitting the square waveform may include operations, features, means, or instructions for transmitting the square waveform to a set of multiple energy harvesting devices associated with a same group identifier or having requested common square waveform characteristics.

In some examples of the method, apparatuses, and non-transitory computer-readable medium described herein, the one or more parameters indicate an average activation power, the requested duty cycle for the square waveform associated with the average activation power, a slope of sensitivity to duty cycle, a saturation duty cycle, one or more characteristics of a rectifier, or any combination thereof.

In some examples of the method, apparatuses, and non-transitory computer-readable medium described herein, the energy harvesting signal indicates a request for the control message and the control message may be in response to the request.

In some examples of the method, apparatuses, and non-transitory computer-readable medium described herein, the control message indicates a set of parameters for each of one or more sensitivity response curves associated with a respective one or more square waveforms, each square waveform of the respective one or more square waveforms having a respective duty cycle or a respective input power level, or both.

DETAILED DESCRIPTION

Figure 1:
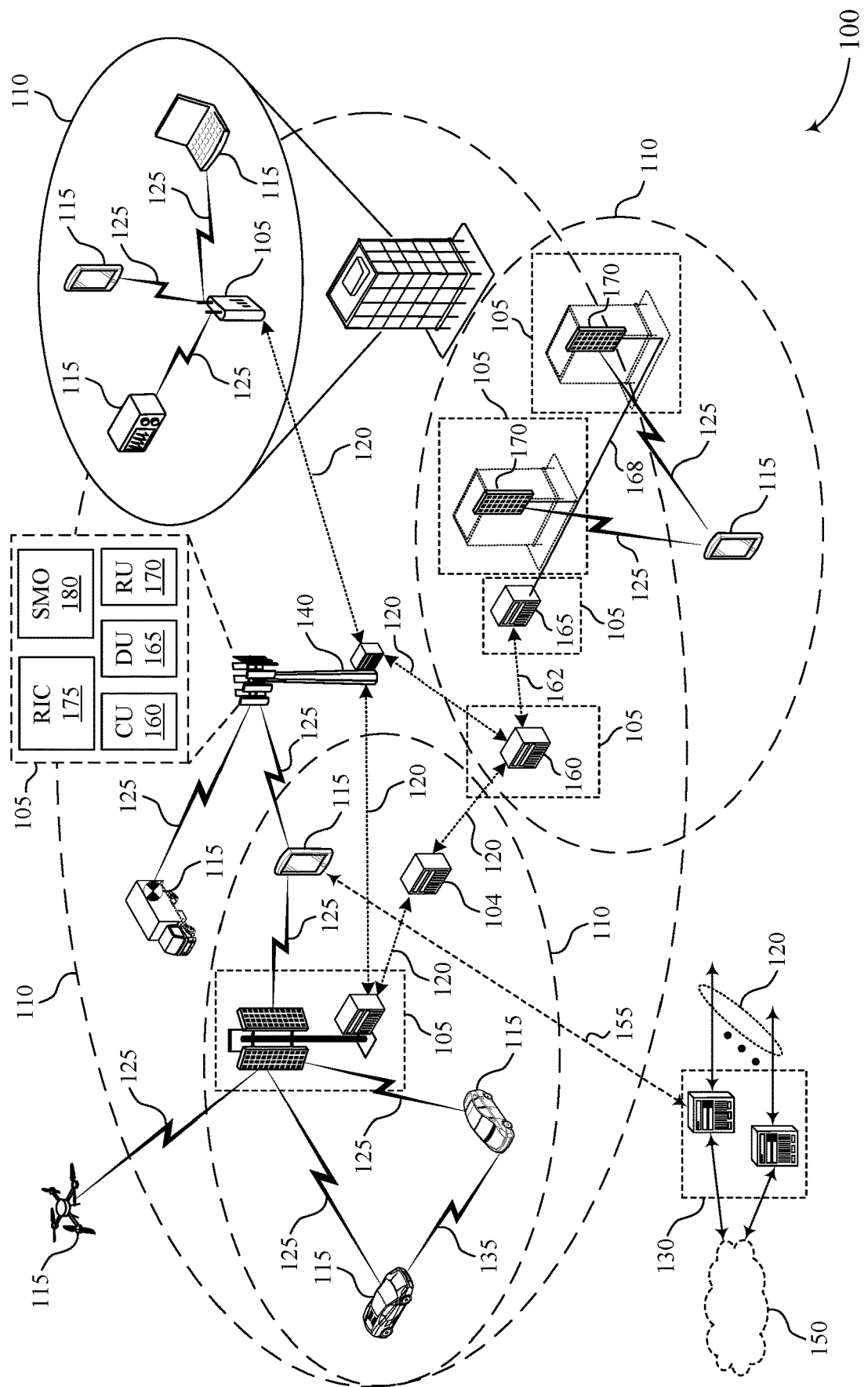
FIG. 1 illustrates an example of a wireless communications system that supports techniques for energy harvesting using a square waveform in accordance with one or more aspects of the present disclosure.

In some wireless communication systems, a wireless device (e.g., a user equipment (UE) or a network node) may communicate with one or more low power devices or other devices that support energy harvesting (e.g., one or more radio frequency identification (RFID) tags, which may also be referred to as UEs, in some examples). To perform energy harvesting, an energy harvesting device may harvest energy from the environment and received signals to perform transmissions. The transmissions by the energy harvesting device may be backscatter modulated. For example, the energy harvesting device may receive a signal, may apply a backscattering function to the received signal, and may transmit a backscattered signal using energy harvested from over the air. A wireless device, such as an energy transfer device, may facilitate the energy harvesting by transmitting an energy transfer signal and receiving the backscattered signal. In some systems, the energy transfer device may transmit a an energy transfer signal with a continuous waveform to the energy harvesting device.

In some cases, a power harvesting circuit at an energy harvesting device may operate non-linearly, where the power harvesting circuit activates, or turns on, when an input power satisfies a threshold. For example, diodes of a rectifier in the power harvesting circuit may be activated after the diodes receive an input power which exceeds the threshold, and the energy harvesting device may perform energy harvesting techniques once the power harvesting circuit is active. Based on the non-linear operation of the power harvesting circuitry, and thereby the energy harvesting device, different waveform types or power output may affect the energy harvesting efficiencies differently based on characteristics or components of the energy harvesting device. For example, a waveform at a set power may be efficient for a first energy harvesting device, but that waveform with the set power may be inefficient for a second energy harvesting device or may not even activate the second energy harvesting device.

The present disclosure relates to energy harvesting techniques and, more specifically, to using a square waveform for energy harvesting techniques. A square waveform may have a high peak-to-average power ratio (PAPR) and may have a configurable duty cycle. An energy transfer device may use a different duty cycle for different energy harvesting devices to provide efficient energy harvesting at the different energy harvesting devices. In some examples, an energy harvesting device may report one or more parameters associated with a square waveform for energy harvesting. For example, the energy harvesting device may report an optimal or requested duty cycle, characteristics of one or more sensitivity curve associated with a respective duty cycle or a respective input power level, a saturation duty cycle, or any combination thereof. In some examples, the energy harvesting device may report the one or more parameters to the energy transfer device. The energy transfer device may transmit, to the energy harvesting device, a square waveform in accordance with the one or more parameters for energy harvesting.

Aspects of the disclosure are initially described in the context of wireless communications systems. Aspects of the disclosure are further illustrated by and described with reference to apparatus diagrams, system diagrams, and flowcharts that relate to techniques for energy harvesting using a square waveform.

FIG. 1 illustrates an example of a wireless communications system 100 that supports techniques for energy harvesting using a square waveform in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for energy harvesting using a square waveform as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115).

In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the wireless communications system 100 may support RFID technologies. RFID technology may be utilized for inventory and asset management, IoT, sustainable sensor networks in factories and/or agriculture, and smart home scenarios, among other example use cases. RFID may include relatively small transponders, or tags (e.g., microchips), that may emit an information-bearing signal upon receiving a signal. RFID may be operated with or without a batter at the RFID device and with relatively low operating cost (OPEX), relatively low maintenance cost, and a relatively long life circle.

In some implementations, the wireless communications system 100 may include one or more passive devices. Passive devices may include, but are not limited to, RFID tags, passive IoT devices, hybrid devices including passive and active components, passive components of otherwise active/querying devices (e.g., passive components of a UE 115), or any combination thereof. For example, in some implementations, a UE 115 of the wireless communications system 100 may serve as a passive device. A passive RFID may harvest energy over the air and may power transmission and reception circuitry at the device using the harvested energy. The transmitted signal by the passive RFID may be backscatter modulated. In some examples, the wireless communications system 100 may include one or more semi-passive or active RFID devices, which may include a battery, but may be more costly than passive devices.

Passive IoT may be supported for different types of wireless communications (e.g., different industrial verticals, including URLLC, MTC, and other use cases). However, some systems may not efficiently support RFID-type sensors, including passive IoT devices for use cases including asset management, logistics, warehousing, and manufacturing, among other examples. Techniques for managing and communicating with passive IoT devices may be beneficial. For example, a network entity 105 may read or write information stored on a passive IoT device, may provide energy to the passive IoT device, may receive a reflected information bearing signal, and may decode information transmitted by passive IoT devices by reading the reflected signal.

Some devices, such as energy harvesting devices, may perform RF power harvesting using power harvesting circuitry. A power harvesting circuit may operate non-linearly with an input power to the power harvesting circuitry. For example, the power harvesting circuitry may not operate until the input power satisfies or exceeds a threshold input power, activating or turning on diodes of the power harvesting circuitry. In some examples, the power harvesting circuitry may not activate until the input power exceeds −20 dBm or −10 dBm, at which point the diodes of the power harvesting circuitry may turn on, and the energy harvesting device may perform the energy harvesting. Some power harvesting circuitry may be more efficient at lower frequencies based on diode junction capacitance and resistance. Some systems may implement frequency-selective techniques for energy harvesting signaling to improve conversion efficiency.

A rectifying process in some power harvesting circuitry may be segmented into two types, including small signal operation and large signal operation. For large signal operation, the rectification of a large input amplitude signal may force a diode to operate in the resistive zone of the diode. For small signal operation, the power harvesting circuitry may have three zones. A first zone may be referred to as a square law zone, where the diode behavior functions nearly quadratically, such that the output signal is proportional to a square of the input signal. A second zone may be referred to as a transition zone, where other contributions impact diode operation. A third zone may be referred to as a resistive zone, where the output signal is proportional to the input signal, and no direct current voltage component is generated.

Based on the non-linear operation of the power harvesting circuitry, different waveform types or power output may affect the energy harvesting efficiencies differently based on characteristics or components of an energy harvesting device. For example, a waveform at a set power may be efficient for a first energy harvesting device, but that waveform with the set power may be inefficient for a second energy harvesting device or may not even activate the second energy harvesting device. Some systems may use a continuous waveform as an energy transfer signal. However, a continuous waveform may not be suitable for different devices having different power harvesting circuitry.

Techniques, systems, and devices described herein provide for an energy transfer device, such as a UE 115, a network entity 105, or some other type of wireless device, to use a square waveform for energy harvesting techniques. A square waveform may have a high peak-to-average power ratio (PAPR) and may have a configurable duty cycle. An energy transfer device may use a different duty cycle to transmit a square waveform to different energy harvesting devices, which may provide efficient energy harvesting at the different energy harvesting devices. In some examples, an energy harvesting device may report one or more parameters associated with a square waveform for energy harvesting. For example, the energy harvesting device may report an optimal or requested duty cycle, characteristics of one or more sensitivity curves associated with a respective duty cycle or a respective input power level, a saturation duty cycle, or any combination thereof. In some examples, the energy harvesting device may report the one or more parameters to the energy transfer device. The energy transfer device may transmit, to the energy harvesting device, a square waveform in accordance with the one or more parameters for energy harvesting.

Figure 2:
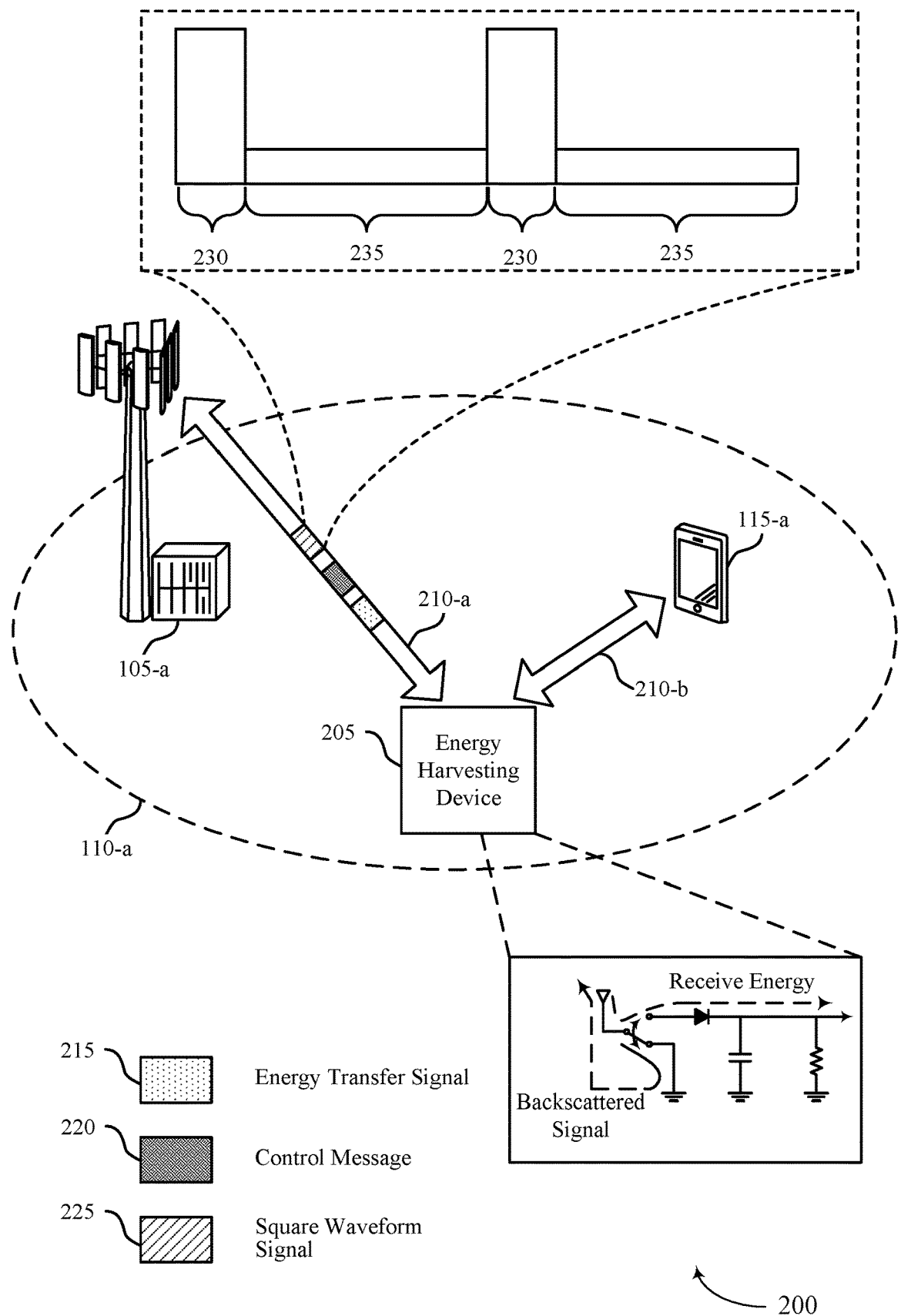
FIG. 2 illustrates an example of a wireless communications system that supports techniques for energy harvesting using a square waveform in accordance with one or more aspects of the present disclosure.

FIG. 2 illustrates an example of a wireless communications system 200 that supports techniques for energy harvesting using a square waveform in accordance with one or more aspects of the present disclosure. The wireless communications system 200 may implement or be implemented by aspects of the wireless communications system 100. For example, the wireless communications system 200 illustrates a network entity 105-a and a UE 115-a, which may represent examples of corresponding devices as described with reference to FIG. 1. The network entity 105-a and the UE 115-a may communicate within a geographic coverage area 110-a and via a communication link 210. In some examples, the network entity 105-a, the UE 115-a, or both may communicate with an energy harvesting device 205 via communication links 210-a and 210-b, respectively.

The energy harvesting device 205 may be a UE 115, a network entity 105, a RFID tag, an IoT device, or any other type of wireless device. As described with reference to FIG. 1, the energy harvesting device 205 may harvest energy from a received signal and may use the harvested energy to transmit or backscatter a signal. The signal may be referred to as an energy transfer signal 215. The energy harvesting device 205 may receive an energy transfer signal 215 from the network entity 105-a, the UE 115-a, one or more other wireless devices, or any combination thereof. That is, the described techniques for energy harvesting and backscattering may be performed by any type of wireless device described herein. A device that transmits the energy transfer signal 215 may be referred to as an energy transfer device, in some examples.

In some examples, the wireless devices of the wireless communications system 200 (e.g., the network entity 105-a, the UE 115-a, and the energy harvesting device 205) may communicate with one another via energy harvesting and backscatter communication. The terms "forward communication" and "backscatter communication" may refer to a relative direction of communication between an energy transfer device and an energy harvesting device 205. For example, in the context of backscatter communication, the UE 115-a (e.g., an energy transfer device) may transmit a signal or query to the energy harvesting device 205 via a forward link of a communication link 210-b, and the energy harvesting device 205 may transmit a backscattered message via a backscatter link of the communication link 210-b. The network entity 105-a may similarly support energy harvesting and backscatter communication with the energy harvesting device 205 via the communication link 210-a.

For the purposes of the present disclosure, the term "energy transfer device," and like terms, may be used interchangeably to refer to wireless devices that are configured to transmit commands or queries (e.g., energy transfer signals) to passive devices or other devices that are configured to perform energy harvesting, such as the energy harvesting device 205. Moreover, the term "energy transfer device," and like terms, may broadly be used to refer to wireless devices which transmit and/or receive signals from energy harvesting devices 205, and may therefore include "RF sources" and "Readers," or both. In this regard, energy transfer devices may include UEs 115, network entities 105, IAB nodes, and the like.

As noted previously herein, in some implementations, an energy harvesting device may be a relatively low-complexity device which may or may not include a power amplifier and/or a battery. In some cases, an energy harvesting device 205 may include one or more antennas (e.g., dipole antennas) and other circuitry (e.g., integrated circuit, chip, load) used to facilitate wireless communications. In some aspects, the range over which an energy harvesting device 205 can transmit a message (e.g., a backscattered signal) may depend on the manner in which the respective energy harvesting device 205 is powered. For example, in some cases, an energy harvesting device 205 may not include a power source, but may instead receive power from wireless communications received from energy transfer devices and may transmit far-field signals or modulate reflected signals using power absorbed or extracted from signals received from energy transfer devices. In such cases, the range of such energy harvesting devices 205 may be relatively small.

In some aspects, an energy harvesting device 205 may receive or generate power (e.g., RF power harvesting) used for wireless communications and other operations using a rectifier, where a rectifier may include a diode and a capacitor. For example, an energy harvesting device 205 may receive a signal from an energy transfer device (e.g., the UE 115-a or the network entity 105-a) via an antenna, where power absorbed from the antenna is directed to a power rectifier. In this example, the power rectifier may convert absorbed power from the antenna to rectified power, which may be directed back to the antenna to transmit messages (e.g., transmit backscattered signals). The input power may be nonlinear at power headroom, in some examples, due to one or more diodes. In some examples, the input power absorbed from the antenna may be greater than a threshold power (e.g., −20 decibel milliwatts (dBm), or some other threshold) to turn on the power harvesting circuitry at the energy harvesting device 205 (e.g., due to a turn-on voltage of one or more diodes). The power harvesting may, in some examples, be more efficient at lower frequencies based on diode junction capacitance and resistance (e.g., frequency-selective conversion efficiency).

Techniques, systems, and devices described herein provide for an energy transfer device to transmit a square waveform signal 225 for energy harvesting procedures. In some cases, a multi-sine and high PAPR OFDM waveform, such as a square waveform or a rectangular waveform, may provide higher coverage gain than a continuous waveform. However, an optimal duty cycle, or a duty cycle resulting in peak efficiency, may be different for each energy harvesting device. For example, an optimal duty cycle for the energy harvesting device 205 may be 1%, while an optimal duty cycle for another energy harvesting device may be 0.9%. In some examples, the square waveform signal 225 may be an example of an energy transfer signal, such as the energy transfer signal 215.

The energy harvesting device 205 may transmit a control message 220 which indicates or reports an optimal duty cycle for the energy harvesting device 205 or a power harvesting circuit of the energy harvesting device 205. In some examples, the control message 220 may indicate the optimal duty cycle, one or more slopes of respective sensitivity vs duty cycle curves, a saturation duty cycle (e.g., no sensitivity improvement for duty cycle above 10%), or characteristics of the respective sensitivity vs duty cycle curves, or any combination thereof. The energy harvesting device 205 may, for example, report characteristics of one or more sensitivity response curves as described with reference to FIG. 3. The energy harvesting device 205 may transmit the control message 220 indicating the one or more parameters to an energy transfer device, a UE 115 (e.g., the UE 115-a), a network entity 105 (e.g., the network entity 105-a), or a network node, among other devices or types of devices.

In some examples, the energy harvesting device 205 may transmit the control message 220, or otherwise report characteristics or parameter for a square waveform for energy harvesting, in response to signaling from the energy transfer device or detecting a trigger. For example, the network entity 105-a may transmit the energy transfer signal 215 to the energy harvesting device 205. Upon receiving the energy transfer signal 215, the energy harvesting device 205 may transmit the control message 220 to the network entity 105-a in response. In an example, the energy transfer signal 215 may be a square waveform for energy harvesting techniques, but the energy transfer signal 215 may not be configured for an optimal duty cycle of the energy harvesting device 205. The energy harvesting device 205 may transmit the control message 220 to the network entity 105-a such that the network entity 105-a may use an optimal duty cycle when transmitting a square waveform for energy harvesting to the energy harvesting device 205. In some examples, the network entity 105-a may transmit control signaling including a request for parameters associated with the square waveform signal 225, and the energy harvesting device 205 may transmit the control message 220 in response.

The energy transfer device, such as the network entity 105-a, may transmit a square waveform signal 225 for energy harvesting or wireless power transfer to the energy harvesting device 205. In some examples, the square waveform signal 225 may be configured in accordance with the one or more parameters indicated by the control message 220, such as the optimal duty cycle. For example, the energy harvesting device 205 may indicate that an optimal duty cycle for power harvesting circuitry of the energy harvesting device 205 is 1%, and the network entity 105-a may transmit the square waveform signal 225 with a duty cycle of 1% to the energy harvesting device 205 for wireless power transfer or backscatter communications. In some examples, the energy transfer device may perform power boosting during the "on" duration of the square waveform signal 225, transmitting the square waveform signal 225 with a higher power.

In some examples, the energy transfer device may transmit a square waveform signal 225 to deliver wireless power to a specific energy harvesting device, such as the energy harvesting device 205, or to a group of energy harvesting devices associated with a similar square waveform. For example, multiple energy harvesting devices may have a similar or same optimal duty cycle or have similar or same sensitivity curve characteristics, or both. The network entity 105-a may transmit the same signal for energy harvesting (e.g., the square waveform signal 225) to the multiple energy harvesting devices having the similar or same optimal duty cycle or sensitivity curve characteristics.

In some examples, a capacitor or battery at an energy harvesting device may discharge if a power-providing square waveform has a long "off" duration. For example, an "on" duration may charge a capacitor or battery of the energy harvesting device 205. Once the energy transfer device stops transmitting the energy transfer signal to the energy harvesting device 205, the waveform may be in an "off" duration, and an energy storage component (e.g., a capacitor or battery) of the energy harvesting device 205 may slowly discharge during the "off" duration. In some examples, intermittent charging using a super capacitor may begin discharging during the "off" duration. Discharging may limit energy storage life (e.g., battery life, capacitor life) or reduce reliability of the energy harvesting device.

In some examples, the square waveform signal 225 may have an "on" period 230 and an "off" period 235, where the "off" period 235 has a non-zero power. The "on" period 230 may correspond to a high power for energy harvesting, while the "off" period 235 has a low power. The low power of the "off" period 235 may maintain power or voltage at the energy harvesting device 205 or enable the energy harvesting device 205 to support backscatter communication during the "off" period 235, or both.

In some examples, the energy harvesting device 205 may indicate timings or durations of the "on" period 230 or the "off" period 235, or both. For example, the energy harvesting device 205 may indicate a duration for the "on" period 230, a power for the "on" period 230, or a frequency of the "on" period 230, or any combination thereof. In some example, the energy harvesting device 205 may indicate the information associated with the "on" period 230 or the "off" period via the control message 220 or via separate signaling. In some examples, the energy harvesting device 205 may have a preferred or optimal periodicity for the square waveform for a fixed percentage of on time. For example, the preferred or optimal periodicity of the square waveform may be 1 ms (e.g., including both the "on" period 230 and the "off" period 235) with a 10% on time, or the "on" period 230 lasting 0.1 ms. In some examples, the energy harvesting device 205 may indicate the preferred or optimal periodicity of the square waveform to the energy transfer device (e.g., via the control message 220 or separately).

In an example, the network entity 105-a may transmit an energy transfer signal 215 to the energy harvesting device 205. In some examples, the energy may indicate or include a request for parameters associated with a square waveform for wireless power transfer. The energy harvesting device 205 may transmit a control message 220 to the network entity 105-a. The control message 220 may indicate an optimal, requested, or ideal duty cycle for a square waveform of a signal used for wireless power transfer. In some examples, the energy harvesting device 205 may transmit the control message 220 in response to the request or the energy transfer signal 215.

The network entity 105-a may receive the control message 220 and transmit a square waveform signal 225 to the energy harvesting device 205. The square waveform signal 225 may be used for energy harvesting or backscatter communications at the energy harvesting device 205. In some examples, characteristics of the square waveform signal 225 may be based on the control message 220, or parameters or characteristics indicated by the control message 220. For example, a waveform of the square waveform signal 225 may have a duty cycle or peak voltage which corresponds to a requested or optimal duty cycle indicated by the control message 220. The square waveform signal 225 may have an "on" period 230 and an "off" period 235. For example, the network entity 105-a may transmit the square waveform signal 225 with a high power during an "on" period 230 then transmit the square waveform signal 225 with a low power, or in some cases zero power, during an "off" period 235.

Figure 3:
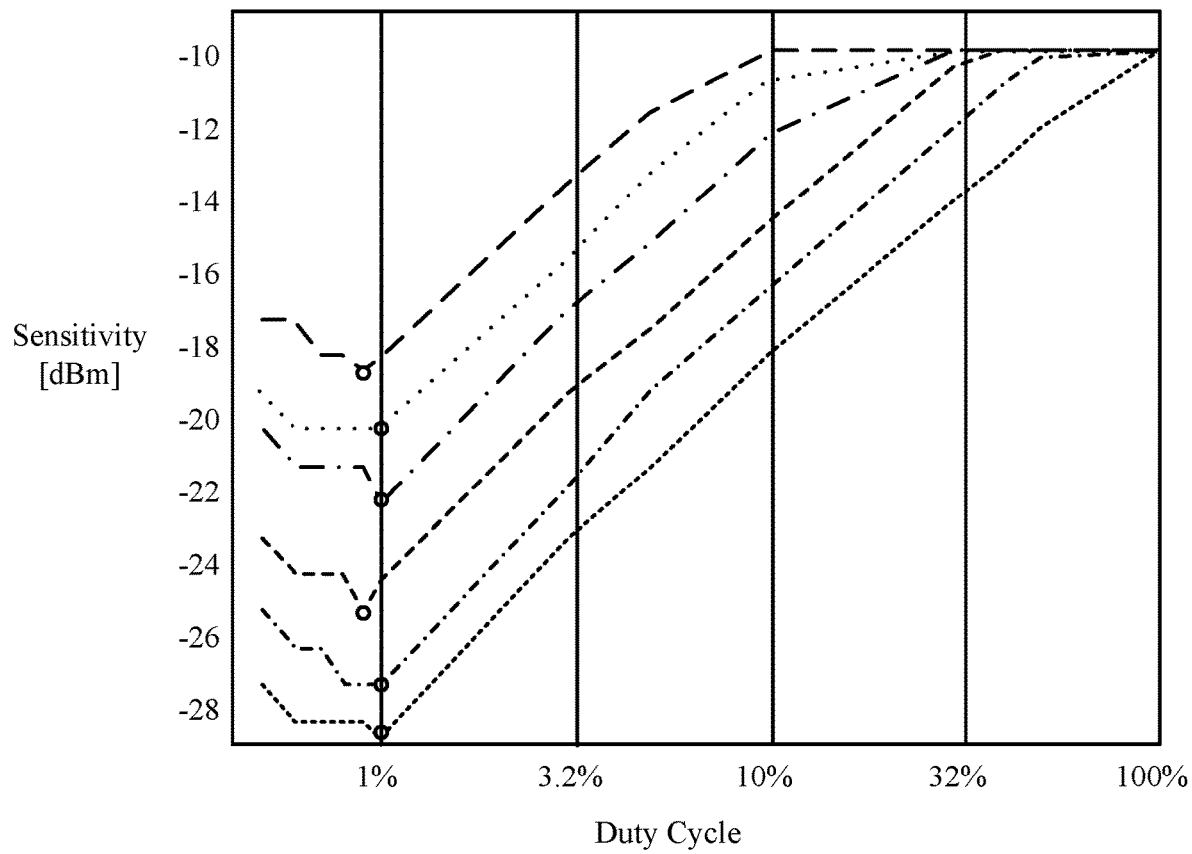
FIG. 3 illustrates an example of sensitivity response curves that support techniques for energy harvesting using a square waveform in accordance with one or more aspects of the present disclosure.

FIG. 3 illustrates an example of sensitivity curves 300 that supports techniques for energy harvesting using a square waveform in accordance with one or more aspects of the present disclosure.

An energy harvesting device, such as an energy harvesting device 205 described with reference to FIG. 2, may have a sensitivity curve 300 based on characteristics of the energy harvesting device or power harvesting circuitry of the energy harvesting device. A first curve 305 corresponds to a first energy harvesting device which has a minimum voltage threshold of 1.2 volts. A second curve 310, a third curve 315, a fourth curve 320, a fifth curve 325, and a sixth curve 330 may correspond to energy harvesting devices which minimum voltage thresholds of 0.9 volts, 0.7 volts, 0.5 volts, 0.3 volts, and 0.1 volts, respectively. These techniques may be similarly implemented for energy harvesting devices with different activation voltages or different minimum voltages not shown.

The sensitivity curves 300 show a minimum input power for energy harvesting (e.g., achieving a certain voltage or power) at a capacitor of an energy harvesting device for different duty cycles of a square waveform signal used for power harvesting. In an example, at 100% duty cycle, an energy harvesting device with a minimum activation voltage of 1.2 volts may have a sensitivity of approximately −10 dBm, such that the energy harvesting device must receive a power transfer signal with a minimum of −10 dBm power in order to perform energy harvesting techniques.

By using a square waveform for an energy transfer signal as described herein, the sensitivity for energy harvesting devices may be improved. For example, as the duty cycle decreases, the sensitivity for an energy harvesting device to perform energy harvesting techniques may be increased.

For the first curve 305, an energy harvesting device with an activation voltage of 1.2 volts may have a peak sensitivity with a duty cycle of 0.9%. If, for example, an energy transfer device transmits a square waveform for wireless power transfer with a duty cycle of 0.9%, the energy harvesting device may be able to perform power harvesting at an input power of approximately −18.7 dBm, which may be an 8.7 dB gain compared to a duty cycle of 100% or a continuous waveform. In some examples, the energy harvesting device may transmit a control message indicating an optimal duty cycle, or a duty cycle which most increases sensitivity for energy harvesting at the energy harvesting device, to the energy transfer device. The energy transfer device may transmit a square waveform having the optimal duty cycle to the energy harvesting device based on the indication.

Different devices, such as energy harvesting devices having different activation voltages, may have different sensitivity curves or different optimal duty cycles. Additionally, these different optimal duty cycles may result in different sensitivity gains. For example, a second energy harvesting device with the second curve 310 may have an optimal duty cycle at 1%, which may yield approximately a 10.3 dB gain compared to a continuous waveform or a 100% duty cycle. The third curve 315, the fifth curve 325, and the sixth curve 330 may each similarly have an optimal duty cycle at 1%, which may yield 12.3 dB, 17.3 dB, and 18.7 dB gains, respectively. The values of the sensitivities, sensitivity gains, and activation voltages may be exemplary.

In some examples, an energy harvesting device may report characteristics of one or more of the sensitivity curves 300 to a network. For example, the energy harvesting device may have an input voltage or an activation voltage of 0.9 volts, and the energy harvesting device may transmit a control message indicating characteristics, values, or parameters for the second curve 310 to the network or an energy transfer device. For example, the control message may indicate one or more sensitivities at one or more respective duty cycles. In some examples, the control message may indicate characteristics or parameters for one curve or multiple curves.

Figure 4:
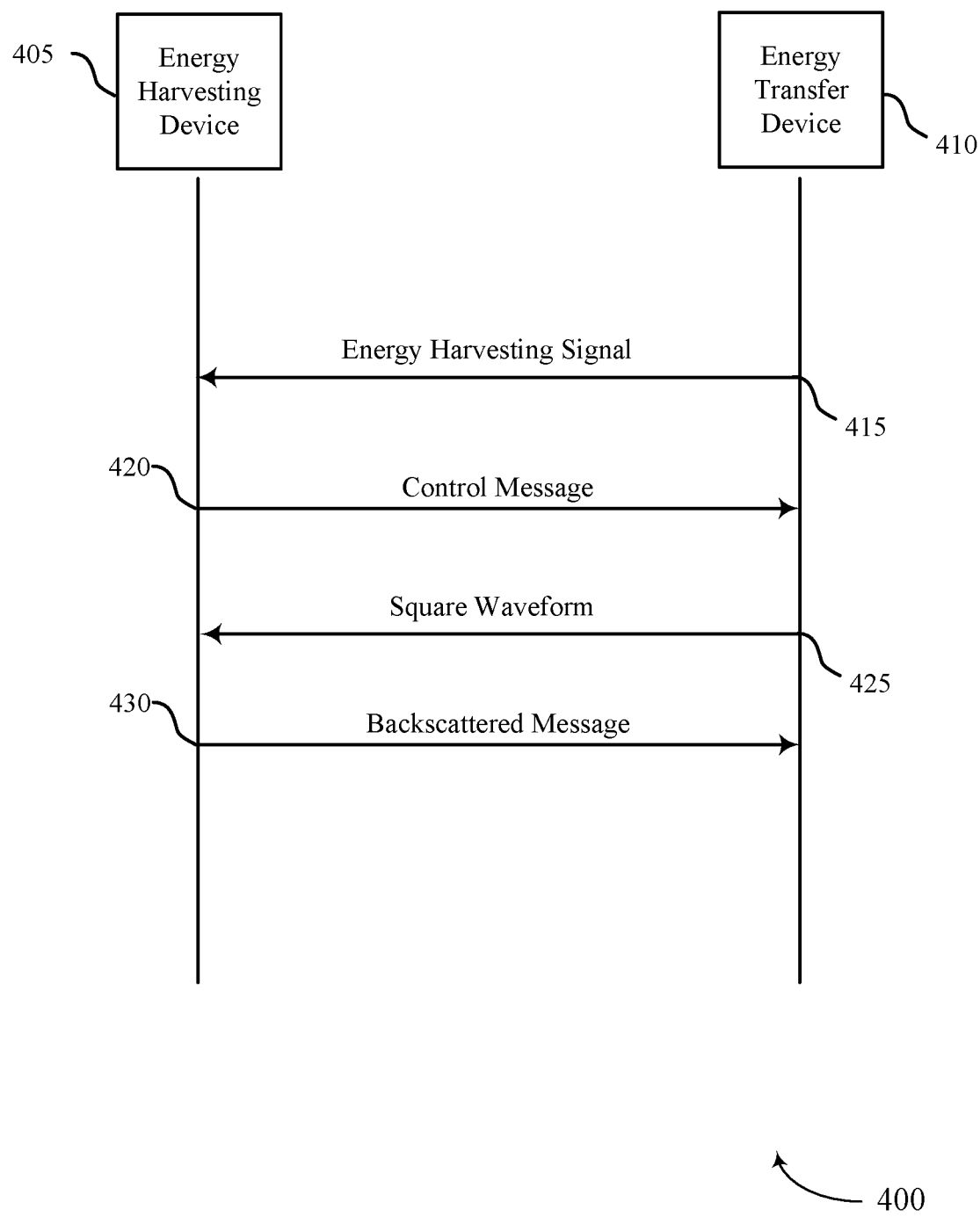
FIG. 4 illustrates an example of a process flow that supports techniques for energy harvesting using a square waveform in accordance with one or more aspects of the present disclosure.

FIG. 4 illustrates an example of a process flow 400 that supports techniques for energy harvesting using a square waveform in accordance with one or more aspects of the present disclosure. The process flow 400 may implement or be implemented by aspects of the wireless communications system 100 and 200 and the sensitivity curves 300, as described with reference to FIGS. 1-3. For example, the process flow 400 may include an energy harvesting device 405 and an energy transfer device 410, which may represent examples of corresponding devices described herein. The process flow 400 illustrates communications between the energy harvesting device 405 and the energy transfer device 410 using a square waveform for energy harvesting techniques.

In the following description of the process flow 400, the operations between the energy harvesting device 405 and the energy transfer device 410 may be performed in different orders or at different times. Some operations may also be left out of the process flow 400, or other operations may be added. Although the energy harvesting device 405 and the energy transfer device 410 are shown performing the operations of the process flow 400, some aspects of some operations may also be performed by one or more other wireless devices.

At 415, the energy transfer device 410 may transmit an energy harvesting signal providing power for the energy harvesting device 405. In some examples, the energy harvesting signal be an example of a square waveform for energy harvesting. In some other examples, the energy harvesting signal may be an example of a continuous waveform signal. The energy harvesting signal may provide power to the energy harvesting device 405 for energy harvesting or backscatter communications.

At 420, the energy harvesting device 405 may transmit, based on the energy harvesting signal, a control message indicating one or more parameters for a square waveform for energy harvesting, a requested duty cycle for the square waveform, or both. For example, the energy harvesting device 405 may indicate an average activation power of the energy harvesting device 405, the requested duty cycle for the square waveform associated with the average activation power of the energy harvesting device 405, a slope of sensitivity to duty cycle, a saturation duty cycle, one or more characteristics of a rectifier of the energy harvesting device, a requested ON power level, a requested off power level, a duration of time for the ON period, a duration of time for the OFF period, or any combination thereof. In some examples, the requested duty cycle may correspond to an optimal duty cycle for the energy harvesting device 405, such as a duty cycle which provides a peak sensitivity as described with reference to FIG. 3.

In some examples, the control message may indicate one or more parameters that identify one or more sensitivity response curves for a plurality of different square waveforms, each square waveform of the plurality of different square waveforms having a respective duty cycle of a plurality of different duty cycles. In some examples, the control message may indicate one or more parameters that identify one or more sensitivity response curves for a plurality of different square waveforms, each square waveform of the plurality of different square waveforms associated with a respective input power level of a plurality of different input power levels. For example, the control message may indicate parameters or characteristics of sensitivity response curves, as described with reference to FIG. 3, for different input power levels or activation voltages. In an example, the control message may indicate parameters or characteristics associated with a sensitivity response curve for an energy harvesting device with a 1.2 volt activation voltage or a 0.9 volt activation voltages, or both.

In some examples, the energy harvesting device 405 may transmit the control message in response to the energy harvesting signal received at 415. For example, the energy harvesting device 405 may detect the energy harvesting signal and determine that the energy transfer device 410 can support a square waveform for energy harvesting. In some other examples, the energy transfer device 410 may transmit a request for the energy harvesting device 405 to report the request duty cycle, the one or more parameters, or both. In some examples, the energy harvesting signal may include, or indicate, a request for the energy harvesting device 405 to report the request duty cycle, the one or more parameters, or both.

At 425, the energy transfer device 410 may transmit a square waveform for energy harvesting in accordance with the one or more parameters, the requested duty cycle, or both. For example, the energy transfer device 410 may receive the control signaling and identify the requested duty cycle. The energy transfer device 410 may configure a square waveform for energy harvesting to the energy harvesting device 405 based on the control signaling, the indicated parameters, or the requested duty cycle. For example, the energy transfer device 410 may transmit a square waveform for energy harvesting to the energy harvesting device 405, the square waveform having the requested duty cycle.

In some examples, at 430, the energy harvesting device 405 may transmit a message via backscattering. For example, the energy harvesting device 405 may transmit, via backscattering, a packet including information in response to the square waveform.

Figure 5:
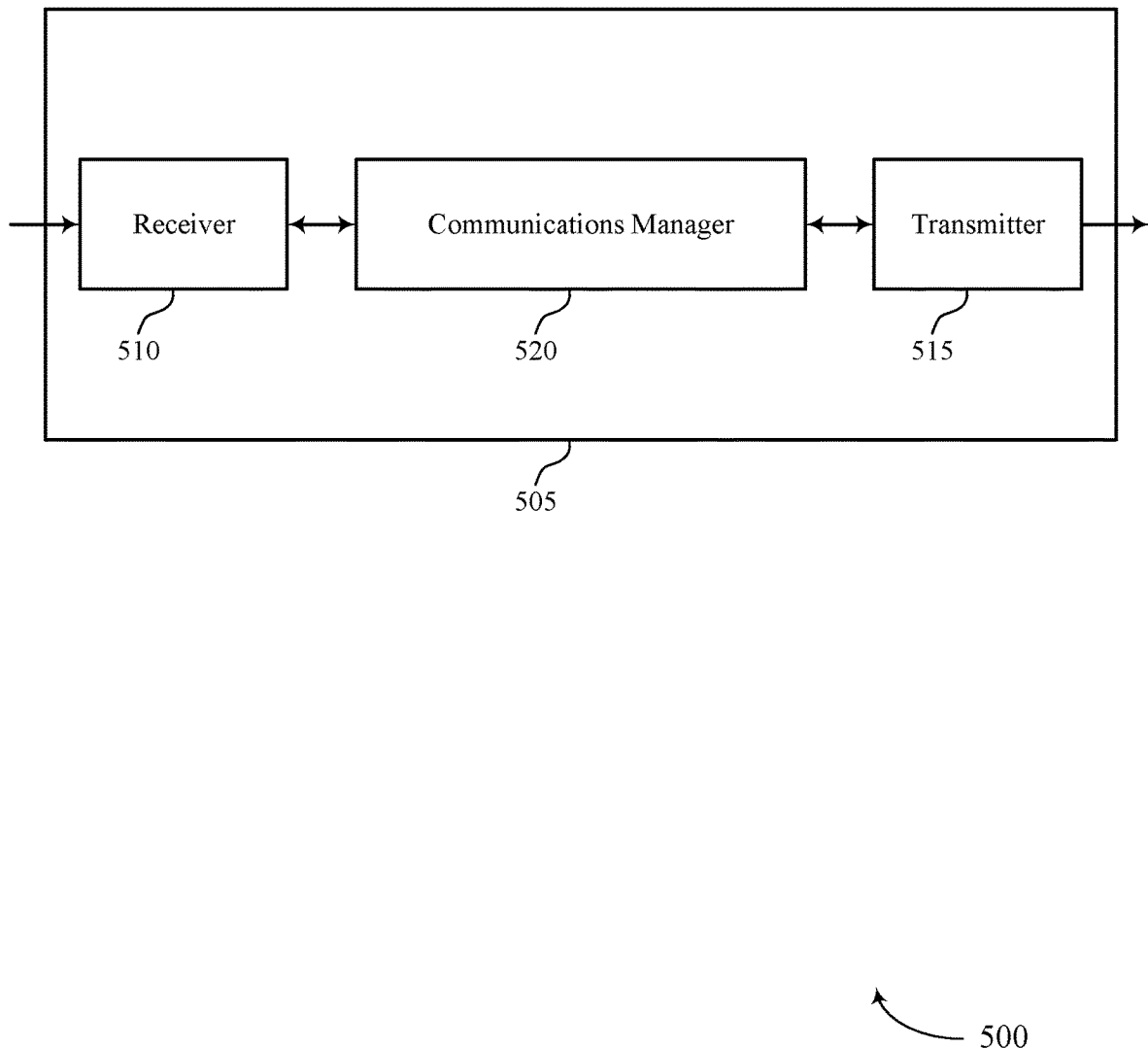
FIGS. 5 and 6 illustrate block diagrams of devices that support techniques for energy harvesting using a square waveform in accordance with one or more aspects of the present disclosure.

FIG. 5 illustrates a block diagram 500 of a device 505 that supports techniques for energy harvesting using a square waveform in accordance with one or more aspects of the present disclosure. The device 505 may be an example of aspects of a UE 115 as described herein. The device 505 may include a receiver 510, a transmitter 515, and a communications manager 520. The device 505 may also include a one or more processors, memory coupled with the one or more processors, and instructions stored in the memory that are executable by the one or more processors to enable the one or more processors to perform the techniques for energy harvesting using a square waveform features discussed herein. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for energy harvesting using a square waveform). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for energy harvesting using a square waveform). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for energy harvesting using a square waveform as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at an energy harvesting device in accordance with examples as disclosed herein. For example, the communications manager 520 may be configured as or otherwise support a means for receiving, from a network node, an energy harvesting signal providing power for the energy harvesting device. The communications manager 520 may be configured as or otherwise support a means for transmitting, based on the energy harvesting signal, a control message indicating one or more parameters for a square waveform for energy harvesting, a requested duty cycle for the square waveform, or both. The communications manager 520 may be configured as or otherwise support a means for receiving the square waveform in response to the control message.

Additionally, or alternatively, the communications manager 520 may support wireless communications at a network node in accordance with examples as disclosed herein. For example, the communications manager 520 may be configured as or otherwise support a means for transmitting an energy harvesting signal providing power for one or more energy harvesting devices. The communications manager 520 may be configured as or otherwise support a means for receiving, based on the energy harvesting signal, a control message indicating one or more parameters for a square waveform for energy harvesting, a requested duty cycle for the square waveform, or both. The communications manager 520 may be configured as or otherwise support a means for transmitting the square waveform for energy harvesting in accordance with the one or more parameters, the requested duty cycle, or both.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for increased sensitivity gain for energy harvesting signaling, which may provide more efficient power utilization due to more reliable energy harvesting at an energy harvesting device.

Figure 6:
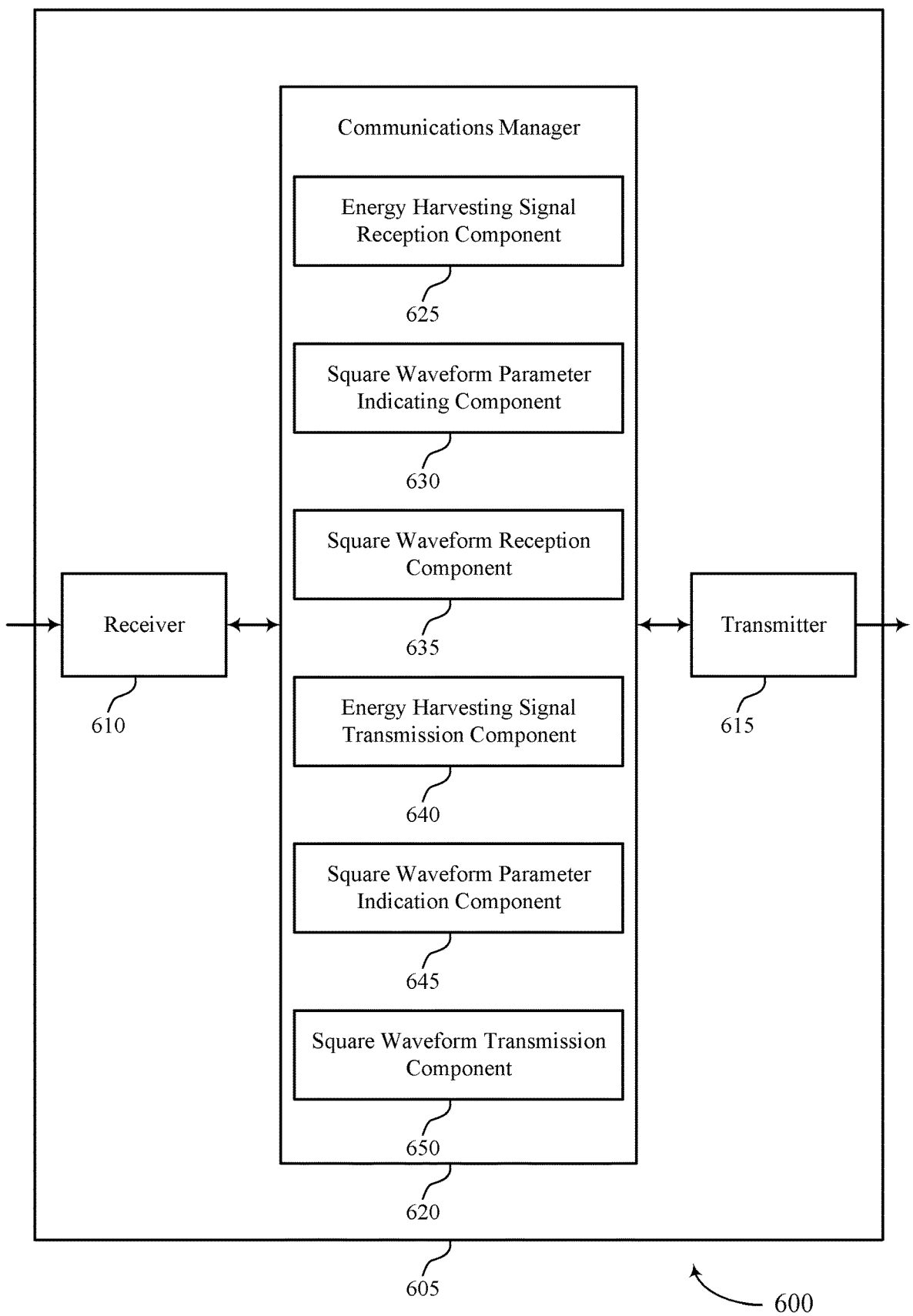

FIG. 6 illustrates a block diagram 600 of a device 605 that supports techniques for energy harvesting using a square waveform in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for energy harvesting using a square waveform). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for energy harvesting using a square waveform). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for energy harvesting using a square waveform as described herein. For example, the communications manager 620 may include an energy harvesting signal reception component 625, a square waveform parameter indicating component 630, a square waveform reception component 635, an energy harvesting signal transmission component 640, a square waveform parameter indication component 645, a square waveform transmission component 650, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at an energy harvesting device in accordance with examples as disclosed herein. The energy harvesting signal reception component 625 may be configured as or otherwise support a means for receiving, from a network node, an energy harvesting signal providing power for the energy harvesting device. The square waveform parameter indicating component 630 may be configured as or otherwise support a means for transmitting, based on the energy harvesting signal, a control message indicating one or more parameters for a square waveform for energy harvesting, a requested duty cycle for the square waveform, or both. The square waveform reception component 635 may be configured as or otherwise support a means for receiving the square waveform in response to the control message.

Additionally, or alternatively, the communications manager 620 may support wireless communications at a network node in accordance with examples as disclosed herein. The energy harvesting signal transmission component 640 may be configured as or otherwise support a means for transmitting an energy harvesting signal providing power for one or more energy harvesting devices. The square waveform parameter indication component 645 may be configured as or otherwise support a means for receiving, based on the energy harvesting signal, a control message indicating one or more parameters for a square waveform for energy harvesting, a requested duty cycle for the square waveform, or both. The square waveform transmission component 650 may be configured as or otherwise support a means for transmitting the square waveform for energy harvesting in accordance with the one or more parameters, the requested duty cycle, or both.

In some cases, the energy harvesting signal reception component 625, the square waveform parameter indicating component 630, the square waveform reception component 635, the energy harvesting signal transmission component 640, the square waveform parameter indication component 645, and the square waveform transmission component 650 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the energy harvesting signal reception component 625, the square waveform parameter indicating component 630, the square waveform reception component 635, the energy harvesting signal transmission component 640, the square waveform parameter indication component 645, and the square waveform transmission component 650 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
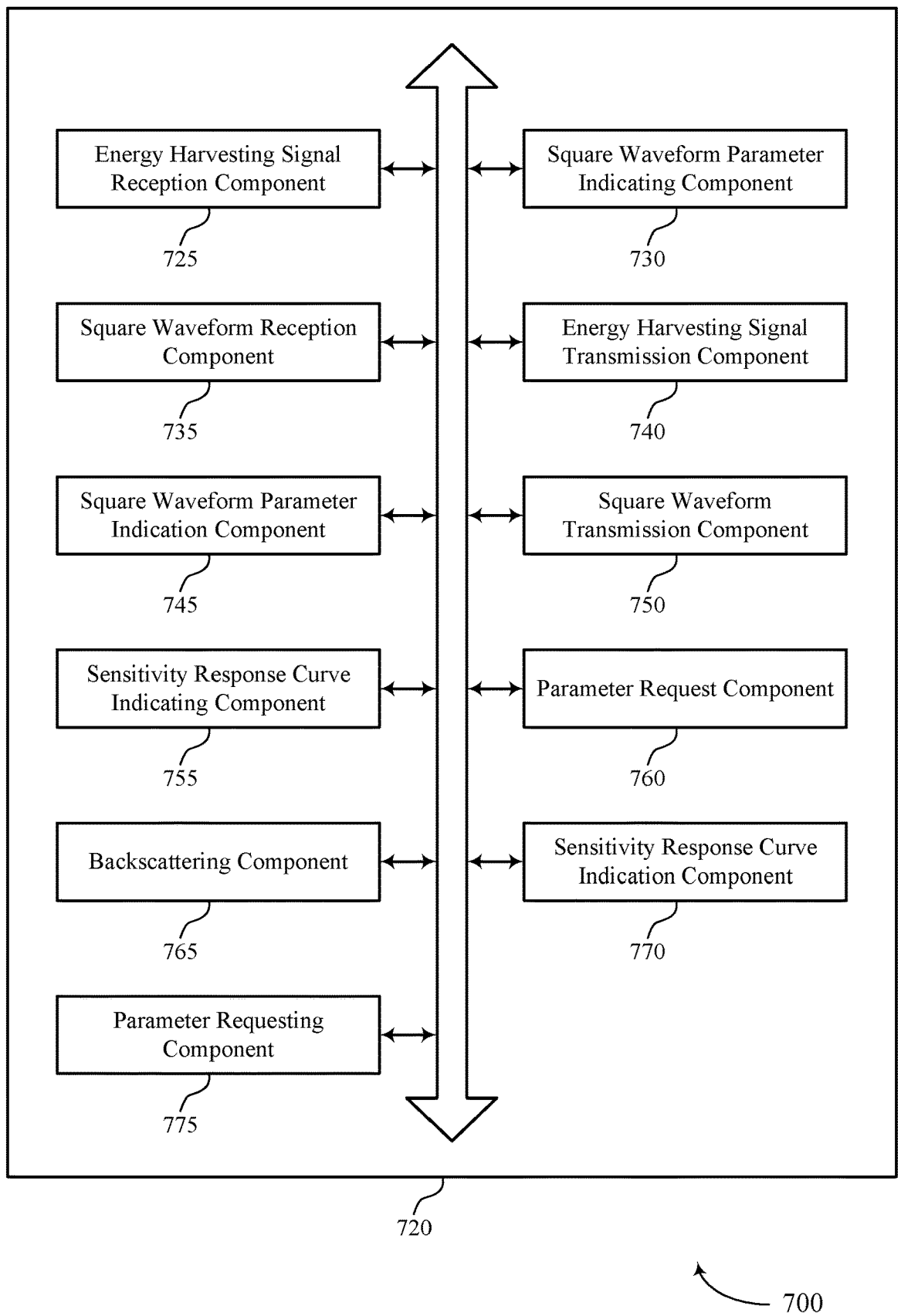
FIG. 7 illustrates a block diagram of a communications manager that supports techniques for energy harvesting using a square waveform in accordance with one or more aspects of the present disclosure.

FIG. 7 illustrates a block diagram 700 of a communications manager 720 that supports techniques for energy harvesting using a square waveform in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for energy harvesting using a square waveform as described herein. For example, the communications manager 720 may include an energy harvesting signal reception component 725, a square waveform parameter indicating component 730, a square waveform reception component 735, an energy harvesting signal transmission component 740, a square waveform parameter indication component 745, a square waveform transmission component 750, a sensitivity response curve indicating component 755, a parameter request component 760, a backscattering component 765, a sensitivity response curve indication component 770, a parameter requesting component 775, or any combination thereof. Each of these components may communicate, directly or indirectly, with one another (e.g., via one or more buses).

The communications manager 720 may support wireless communications at an energy harvesting device in accordance with examples as disclosed herein. The energy harvesting signal reception component 725 may be configured as or otherwise support a means for receiving, from a network node, an energy harvesting signal providing power for the energy harvesting device. The square waveform parameter indicating component 730 may be configured as or otherwise support a means for transmitting, based on the energy harvesting signal, a control message indicating one or more parameters for a square waveform for energy harvesting, a requested duty cycle for the square waveform, or both. The square waveform reception component 735 may be configured as or otherwise support a means for receiving the square waveform in response to the control message.

In some examples, to support transmitting the control message, the sensitivity response curve indicating component 755 may be configured as or otherwise support a means for transmitting the control message that indicates the one or more parameters that identify one or more sensitivity response curves for a set of multiple different square waveforms, each square waveform of the set of multiple different square waveforms having a respective duty cycle of a set of multiple different duty cycles.

In some examples, to support transmitting the control message, the sensitivity response curve indicating component 755 may be configured as or otherwise support a means for transmitting the control message that indicates the one or more parameters that identify one or more sensitivity response curves for a set of multiple different square waveforms, each square waveform of the set of multiple different square waveforms associated with a respective input power level of a set of multiple different input power levels.

In some examples, to support receiving the square waveform, the square waveform reception component 735 may be configured as or otherwise support a means for receiving the square waveform with a first power during a first duration of the requested duty cycle. In some examples, to support receiving the square waveform, the square waveform reception component 735 may be configured as or otherwise support a means for receiving the square waveform with a second power during a second duration the requested duty cycle, where the second power is less than the first power and non-zero.

In some examples, the requested duty cycle indicates the first duration and the second duration.

In some examples, the parameter request component 760 may be configured as or otherwise support a means for receiving a request to report the control message indicating at least the requested duty cycle, the one or more parameters, or both, where transmitting the control message is in response to the request.

In some examples, the energy harvesting signal includes a request to report the requested duty cycle, the one or more parameters, or both. In some examples, transmitting the control message is in response to the request.

In some examples, the one or more parameters indicate an average activation power of the energy harvesting device, the requested duty cycle for the square waveform associated with the average activation power of the energy harvesting device, a slope of sensitivity to duty cycle, a saturation duty cycle, one or more characteristics of a rectifier of the energy harvesting device, or any combination thereof.

In some examples, to support receiving the energy harvesting signal, the energy harvesting signal reception component 725 may be configured as or otherwise support a means for receiving a second square waveform in accordance with a second set of parameters, where transmitting the control message is based on receiving the second square waveform.

In some examples, the backscattering component 765 may be configured as or otherwise support a means for transmitting, via backscattering, a packet including information in response to the square waveform.

In some examples, the control message indicates a set of parameters for each of one or more sensitivity response curves associated with a respective one or more square waveforms, each square waveform of the respective one or more square waveforms having a respective duty cycle or a respective input power level, or both.

Additionally, or alternatively, the communications manager 720 may support wireless communications at a network node in accordance with examples as disclosed herein. The energy harvesting signal transmission component 740 may be configured as or otherwise support a means for transmitting an energy harvesting signal providing power for one or more energy harvesting devices. The square waveform parameter indication component 745 may be configured as or otherwise support a means for receiving, based on the energy harvesting signal, a control message indicating one or more parameters for a square waveform for energy harvesting, a requested duty cycle for the square waveform, or both. The square waveform transmission component 750 may be configured as or otherwise support a means for transmitting the square waveform for energy harvesting in accordance with the one or more parameters, the requested duty cycle, or both.

In some examples, to support receiving the control message, the sensitivity response curve indication component 770 may be configured as or otherwise support a means for receiving the control message that indicates the one or more parameters that identify one or more sensitivity response curves for a set of multiple different square waveforms, each square waveform of the set of multiple different square waveforms having a respective duty cycle of a set of multiple different duty cycles.

In some examples, to support receiving the control message, the sensitivity response curve indication component 770 may be configured as or otherwise support a means for receiving the control message that indicates the one or more parameters that identify one or more sensitivity response curves for a set of multiple different square waveforms, each square waveform of the set of multiple different square waveforms associated with a respective input power level of a set of multiple different input power levels.

In some examples, the parameter requesting component 775 may be configured as or otherwise support a means for transmitting a request for the control message indicating at least the requested duty cycle, the one or more parameters, or both, where the control message is in response to the request.

In some examples, to support transmitting the square waveform, the square waveform transmission component 750 may be configured as or otherwise support a means for transmitting the square waveform with a first power during a first duration of the requested duty cycle. In some examples, to support transmitting the square waveform, the square waveform transmission component 750 may be configured as or otherwise support a means for transmitting the square waveform with a second power during a second duration of the requested duty cycle, where the second power is less than the first power and non-zero.

In some examples, the requested duty cycle indicates the first duration and the second duration.

In some examples, to support transmitting the square waveform, the square waveform transmission component 750 may be configured as or otherwise support a means for transmitting the square waveform to a set of multiple energy harvesting devices associated with a same group identifier or having requested common square waveform characteristics.

In some examples, the one or more parameters indicate an average activation power, the requested duty cycle for the square waveform associated with the average activation power, a slope of sensitivity to duty cycle, a saturation duty cycle, one or more characteristics of a rectifier, or any combination thereof.

In some examples, the energy harvesting signal indicates a request for the control message. In some examples, the control message is in response to the request.

In some examples, the control message indicates a set of parameters for each of one or more sensitivity response curves associated with a respective one or more square waveforms, each square waveform of the respective one or more square waveforms having a respective duty cycle or a respective input power level, or both.

In some cases, the energy harvesting signal reception component 725 the a square waveform parameter indicating component 730, the square waveform reception component 735, the energy harvesting signal transmission component 740, the square waveform parameter indication component 745, the square waveform transmission component 750, the sensitivity response curve indicating component 755, the parameter request component 760, the backscattering component 765, the sensitivity response curve indication component 770, and the parameter requesting component 775 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the energy harvesting signal reception component 725 the a square waveform parameter indicating component 730, the square waveform reception component 735, the energy harvesting signal transmission component 740, the square waveform parameter indication component 745, the square waveform transmission component 750, the sensitivity response curve indicating component 755, the parameter request component 760, the backscattering component 765, the sensitivity response curve indication component 770, and the parameter requesting component 775 discussed herein.

Figure 8:
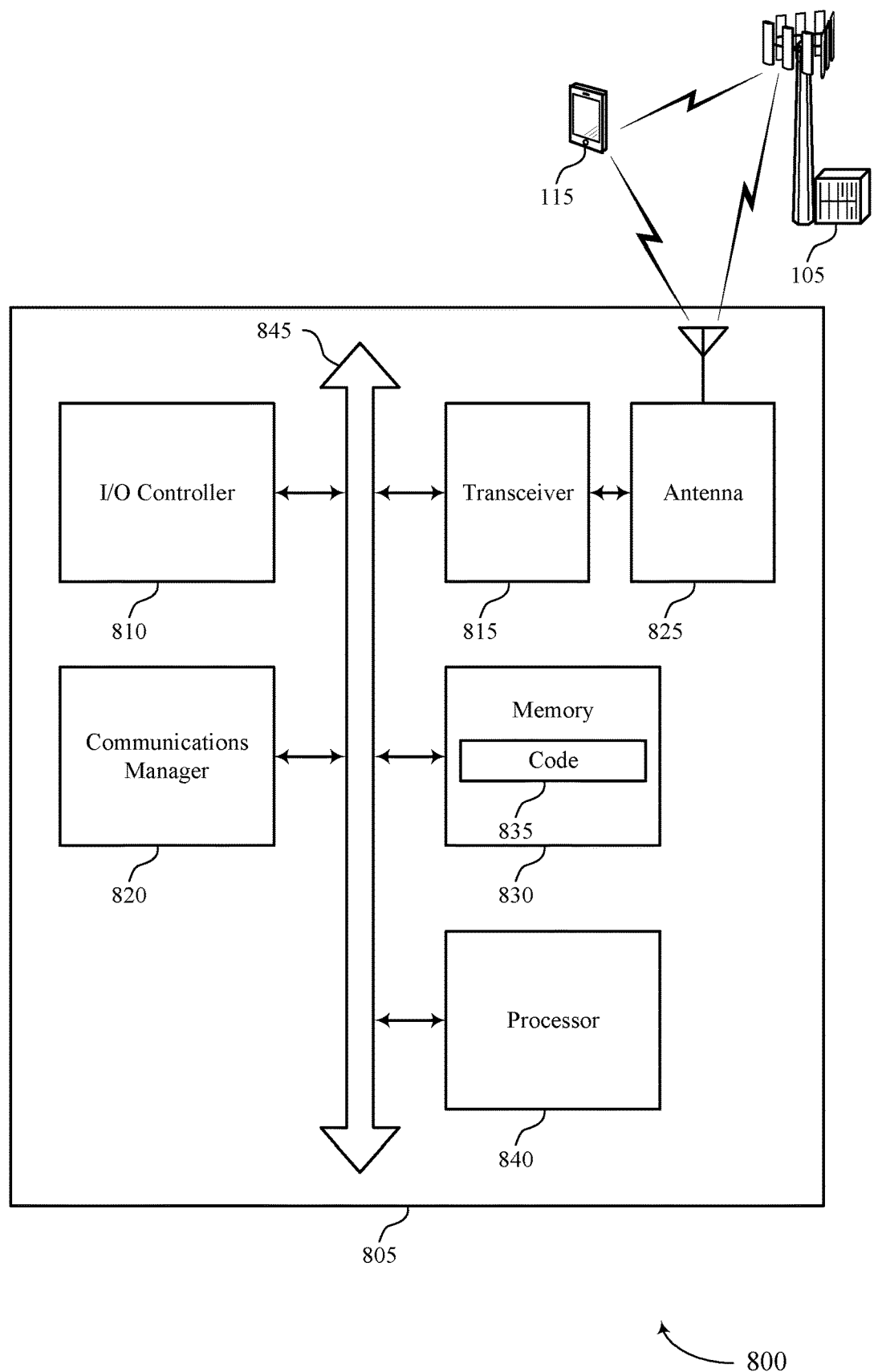
FIG. 8 illustrates a diagram of a system including a device that supports techniques for energy harvesting using a square waveform in accordance with one or more aspects of the present disclosure.

FIG. 8 illustrates a diagram of a system 800 including a device 805 that supports techniques for energy harvesting using a square waveform in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for energy harvesting using a square waveform). For example, the device 805 or a component of the device 805 may include a processor 840 and memory 830 coupled with or to the processor 840, the processor 840 and memory 830 configured to perform various functions described herein.

The communications manager 820 may support wireless communications at an energy harvesting device in accordance with examples as disclosed herein. For example, the communications manager 820 may be configured as or otherwise support a means for receiving, from a network node, an energy harvesting signal providing power for the energy harvesting device. The communications manager 820 may be configured as or otherwise support a means for transmitting, based on the energy harvesting signal, a control message indicating one or more parameters for a square waveform for energy harvesting, a requested duty cycle for the square waveform, or both. The communications manager 820 may be configured as or otherwise support a means for receiving the square waveform in response to the control message.

Additionally, or alternatively, the communications manager 820 may support wireless communications at a network node in accordance with examples as disclosed herein. For example, the communications manager 820 may be configured as or otherwise support a means for transmitting an energy harvesting signal providing power for one or more energy harvesting devices. The communications manager 820 may be configured as or otherwise support a means for receiving, based on the energy harvesting signal, a control message indicating one or more parameters for a square waveform for energy harvesting, a requested duty cycle for the square waveform, or both. The communications manager 820 may be configured as or otherwise support a means for transmitting the square waveform for energy harvesting in accordance with the one or more parameters, the requested duty cycle, or both.

By including or configuring the communications manager 820 in accordance with examples as described herein, the device 805 may support techniques for reduced power consumption, such as due to increased sensitivity for energy harvesting techniques.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for energy harvesting using a square waveform as described herein, or the processor 840 and the memory 830 may be otherwise configured to perform or support such operations.

Figure 9:
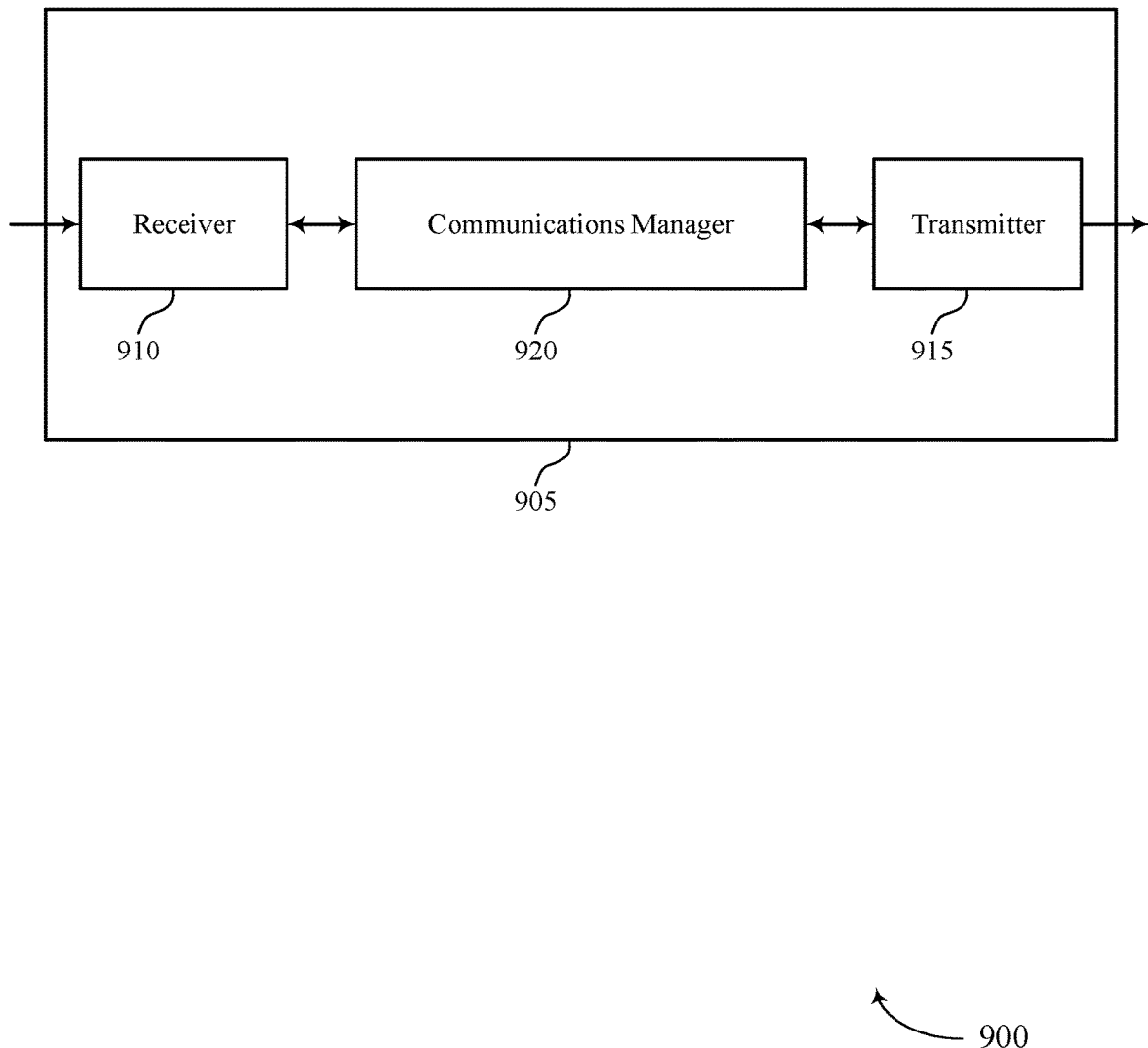
FIGS. 9 and 10 illustrate block diagrams of devices that support techniques for energy harvesting using a square waveform in accordance with one or more aspects of the present disclosure.

FIG. 9 illustrates a block diagram 900 of a device 905 that supports techniques for energy harvesting using a square waveform in accordance with one or more aspects of the present disclosure. The device 905 may be an example of aspects of a network entity 105 as described herein. The device 905 may include a receiver 910, a transmitter 915, and a communications manager 920. The device 905 may also include a one or more processors, memory coupled with the one or more processors, and instructions stored in the memory that are executable by the one or more processors to enable the one or more processors to perform the techniques for energy harvesting using a square waveform features discussed herein. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of techniques for energy harvesting using a square waveform as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network node in accordance with examples as disclosed herein. For example, the communications manager 920 may be configured as or otherwise support a means for transmitting an energy harvesting signal providing power for one or more energy harvesting devices. The communications manager 920 may be configured as or otherwise support a means for receiving, based on the energy harvesting signal, a control message indicating one or more parameters for a square waveform for energy harvesting, a requested duty cycle for the square waveform, or both. The communications manager 920 may be configured as or otherwise support a means for transmitting the square waveform for energy harvesting in accordance with the one or more parameters, the requested duty cycle, or both.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced power consumption by utilizing a square waveform for energy harvesting techniques, which may reduce power output while improving gain for energy harvesting techniques.

Figure 10:
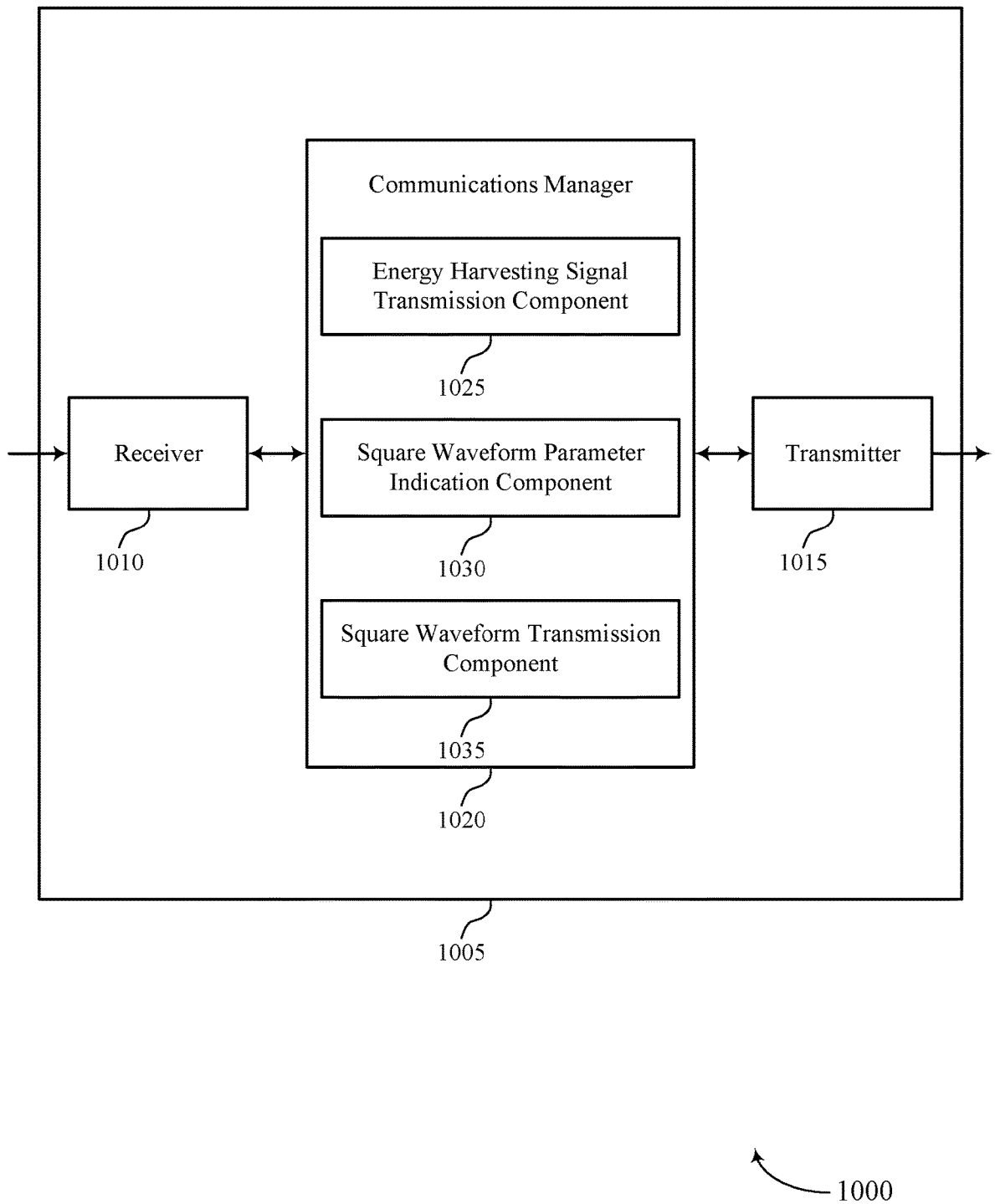

FIG. 10 illustrates a block diagram 1000 of a device 1005 that supports techniques for energy harvesting using a square waveform in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of techniques for energy harvesting using a square waveform as described herein. For example, the communications manager 1020 may include an energy harvesting signal transmission component 1025, a square waveform parameter indication component 1030, a square waveform transmission component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network node in accordance with examples as disclosed herein. The energy harvesting signal transmission component 1025 may be configured as or otherwise support a means for transmitting an energy harvesting signal providing power for one or more energy harvesting devices. The square waveform parameter indication component 1030 may be configured as or otherwise support a means for receiving, based on the energy harvesting signal, a control message indicating one or more parameters for a square waveform for energy harvesting, a requested duty cycle for the square waveform, or both. The square waveform transmission component 1035 may be configured as or otherwise support a means for transmitting the square waveform for energy harvesting in accordance with the one or more parameters, the requested duty cycle, or both.

In some cases, the energy harvesting signal transmission component 1025, the square waveform parameter indication component 1030, and the square waveform transmission component 1035 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the energy harvesting signal transmission component 1025, the square waveform parameter indication component 1030, and the square waveform transmission component 1035 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 11:
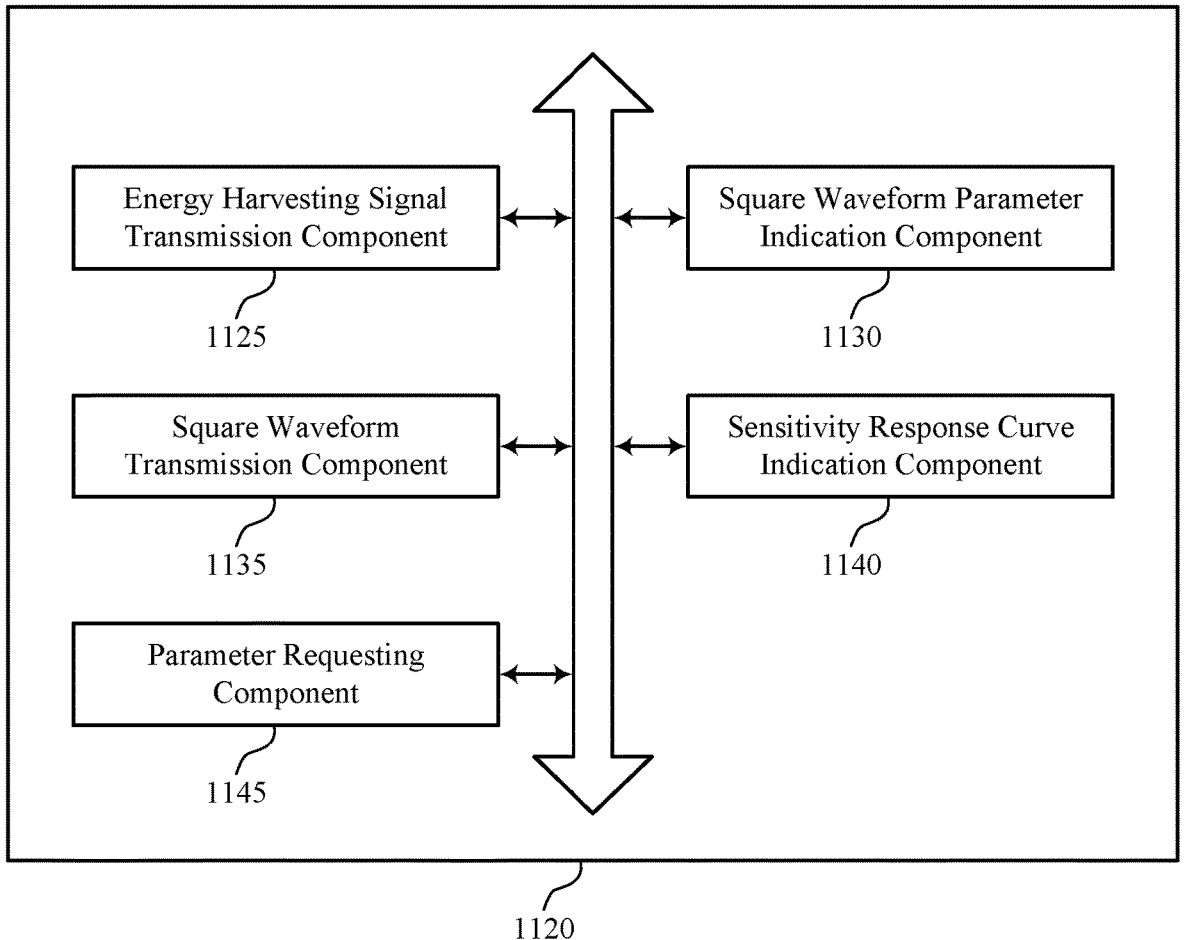
FIG. 11 illustrates a block diagram of a communications manager that supports techniques for energy harvesting using a square waveform in accordance with one or more aspects of the present disclosure.

FIG. 11 illustrates a block diagram 1100 of a communications manager 1120 that supports techniques for energy harvesting using a square waveform in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for energy harvesting using a square waveform as described herein. For example, the communications manager 1120 may include an energy harvesting signal transmission component 1125, a square waveform parameter indication component 1130, a square waveform transmission component 1135, a sensitivity response curve indication component 1140, a parameter requesting component 1145, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network node in accordance with examples as disclosed herein. The energy harvesting signal transmission component 1125 may be configured as or otherwise support a means for transmitting an energy harvesting signal providing power for one or more energy harvesting devices. The square waveform parameter indication component 1130 may be configured as or otherwise support a means for receiving, based on the energy harvesting signal, a control message indicating one or more parameters for a square waveform for energy harvesting, a requested duty cycle for the square waveform, or both. The square waveform transmission component 1135 may be configured as or otherwise support a means for transmitting the square waveform for energy harvesting in accordance with the one or more parameters, the requested duty cycle, or both.

In some examples, to support receiving the control message, the sensitivity response curve indication component 1140 may be configured as or otherwise support a means for receiving the control message that indicates the one or more parameters that identify one or more sensitivity response curves for a set of multiple different square waveforms, each square waveform of the set of multiple different square waveforms having a respective duty cycle of a set of multiple different duty cycles.

In some examples, to support receiving the control message, the sensitivity response curve indication component 1140 may be configured as or otherwise support a means for receiving the control message that indicates the one or more parameters that identify one or more sensitivity response curves for a set of multiple different square waveforms, each square waveform of the set of multiple different square waveforms associated with a respective input power level of a set of multiple different input power levels.

In some examples, the parameter requesting component 1145 may be configured as or otherwise support a means for transmitting a request for the control message indicating at least the requested duty cycle, the one or more parameters, or both, where the control message is in response to the request.

In some examples, to support transmitting the square waveform, the square waveform transmission component 1135 may be configured as or otherwise support a means for transmitting the square waveform with a first power during a first duration of the requested duty cycle. In some examples, to support transmitting the square waveform, the square waveform transmission component 1135 may be configured as or otherwise support a means for transmitting the square waveform with a second power during a second duration of the requested duty cycle, where the second power is less than the first power and non-zero.

In some examples, the requested duty cycle indicates the first duration and the second duration.

In some examples, to support transmitting the square waveform, the square waveform transmission component 1135 may be configured as or otherwise support a means for transmitting the square waveform to a set of multiple energy harvesting devices associated with a same group identifier or having requested common square waveform characteristics.

In some examples, the one or more parameters indicate an average activation power, the requested duty cycle for the square waveform associated with the average activation power, a slope of sensitivity to duty cycle, a saturation duty cycle, one or more characteristics of a rectifier, or any combination thereof.

In some examples, the energy harvesting signal indicates a request for the control message. In some examples, the control message is in response to the request.

In some examples, the control message indicates a set of parameters for each of one or more sensitivity response curves associated with a respective one or more square waveforms, each square waveform of the respective one or more square waveforms having a respective duty cycle or a respective input power level, or both.

In some cases, the energy harvesting signal transmission component 1125, the a square waveform parameter indication component 1130, the square waveform transmission component 1135, the sensitivity response curve indication component 1140, and the parameter requesting component 1145 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the energy harvesting signal transmission component 1125, the a square waveform parameter indication component 1130, the square waveform transmission component 1135, the sensitivity response curve indication component 1140, and the parameter requesting component 1145 discussed herein.

Figure 12:
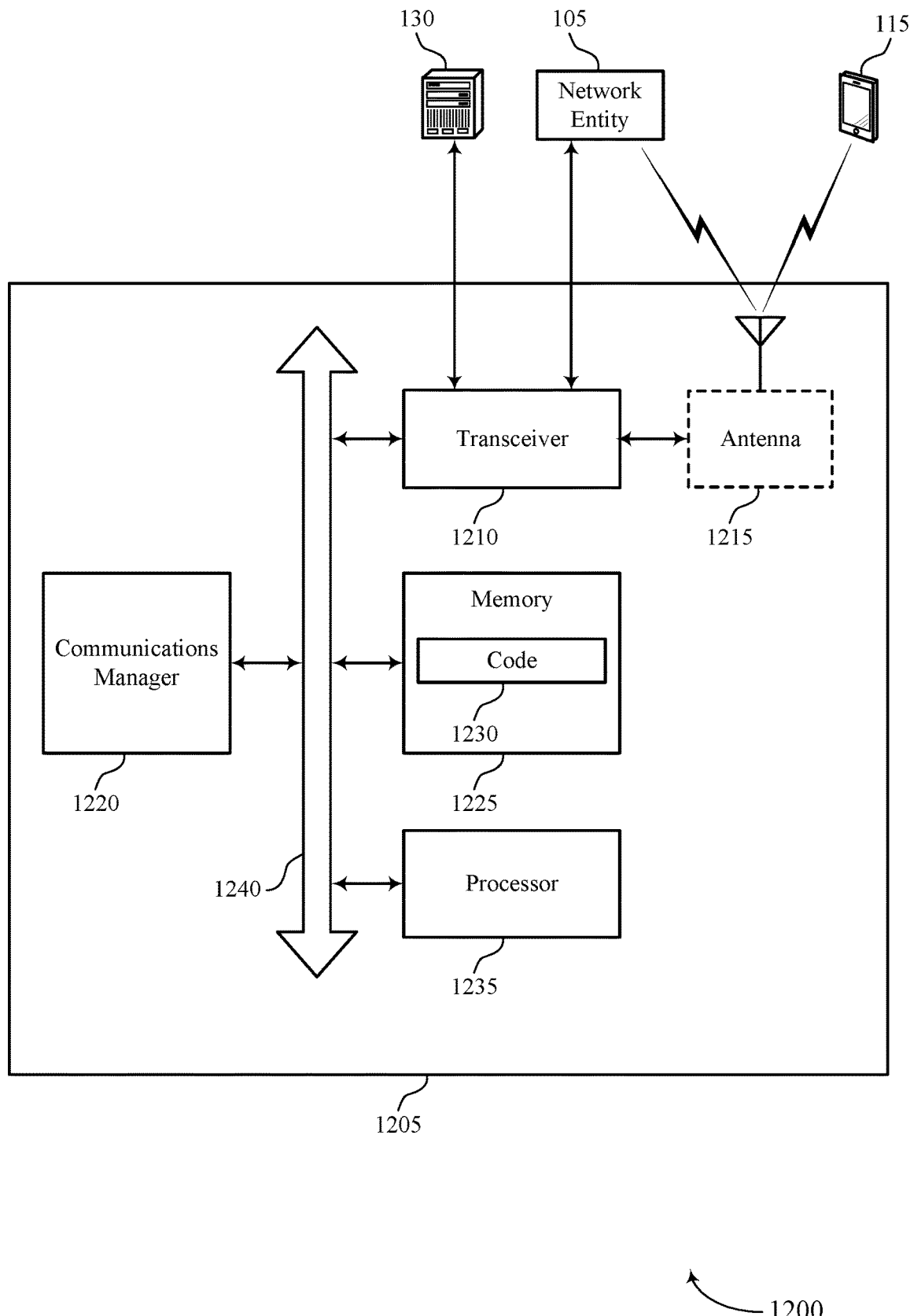
FIG. 12 illustrates a diagram of a system including a device that supports techniques for energy harvesting using a square waveform in accordance with one or more aspects of the present disclosure.

FIG. 12 illustrates a diagram of a system 1200 including a device 1205 that supports techniques for energy harvesting using a square waveform in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting techniques for energy harvesting using a square waveform). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network node in accordance with examples as disclosed herein. For example, the communications manager 1220 may be configured as or otherwise support a means for transmitting an energy harvesting signal providing power for one or more energy harvesting devices. The communications manager 1220 may be configured as or otherwise support a means for receiving, based on the energy harvesting signal, a control message indicating one or more parameters for a square waveform for energy harvesting, a requested duty cycle for the square waveform, or both. The communications manager 1220 may be configured as or otherwise support a means for transmitting the square waveform for energy harvesting in accordance with the one or more parameters, the requested duty cycle, or both.

By including or configuring the communications manager 1220 in accordance with examples as described herein, the device 1205 may support techniques for reduced power consumption by utilizing a square waveform for energy harvesting techniques, which may reduce power output while improving gain for energy harvesting techniques.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of techniques for energy harvesting using a square waveform as described herein, or the processor 1235 and the memory 1225 may be otherwise configured to perform or support such operations.

Figure 13:
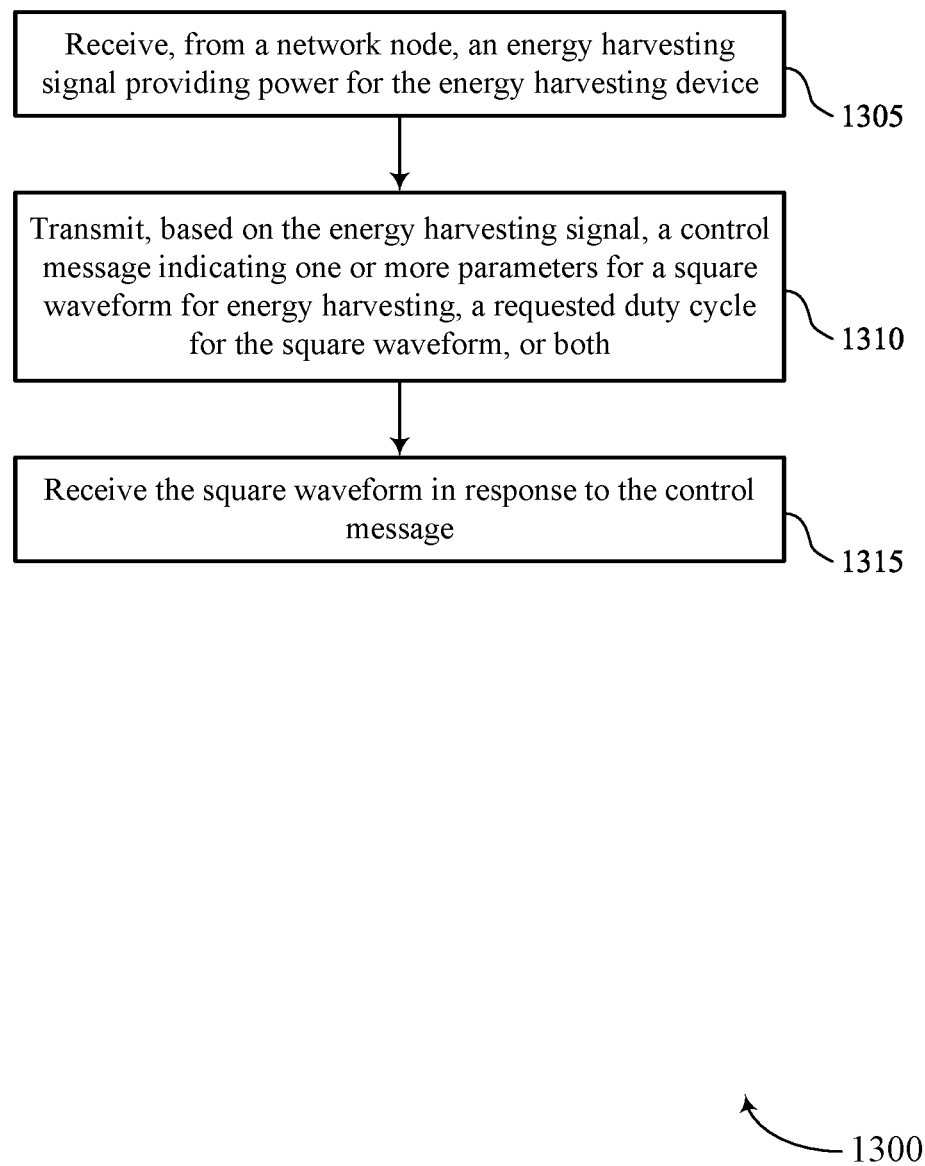
FIGS. 13 through 16 illustrate flowcharts showing methods that support techniques for energy harvesting using a square waveform in accordance with one or more aspects of the present disclosure.

FIG. 13 illustrates a flowchart showing a method 1300 that supports techniques for energy harvesting using a square waveform in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a network node, an energy harvesting signal providing power for the energy harvesting device. The operations of 1305 may be performed in accordance with examples as disclosed herein. In some examples, aspects of the operations of 1305 may be performed by an energy harvesting signal reception component 725 as described with reference to FIG. 7.

At 1310, the method may include transmitting, based on the energy harvesting signal, a control message indicating one or more parameters for a square waveform for energy harvesting, a requested duty cycle for the square waveform, or both. The operations of 1310 may be performed in accordance with examples as disclosed herein. In some examples, aspects of the operations of 1310 may be performed by a square waveform parameter indicating component 730 as described with reference to FIG. 7.

At 1315, the method may include receiving the square waveform in response to the control message. The operations of 1315 may be performed in accordance with examples as disclosed herein. In some examples, aspects of the operations of 1315 may be performed by a square waveform reception component 735 as described with reference to FIG. 7.

Figure 14:
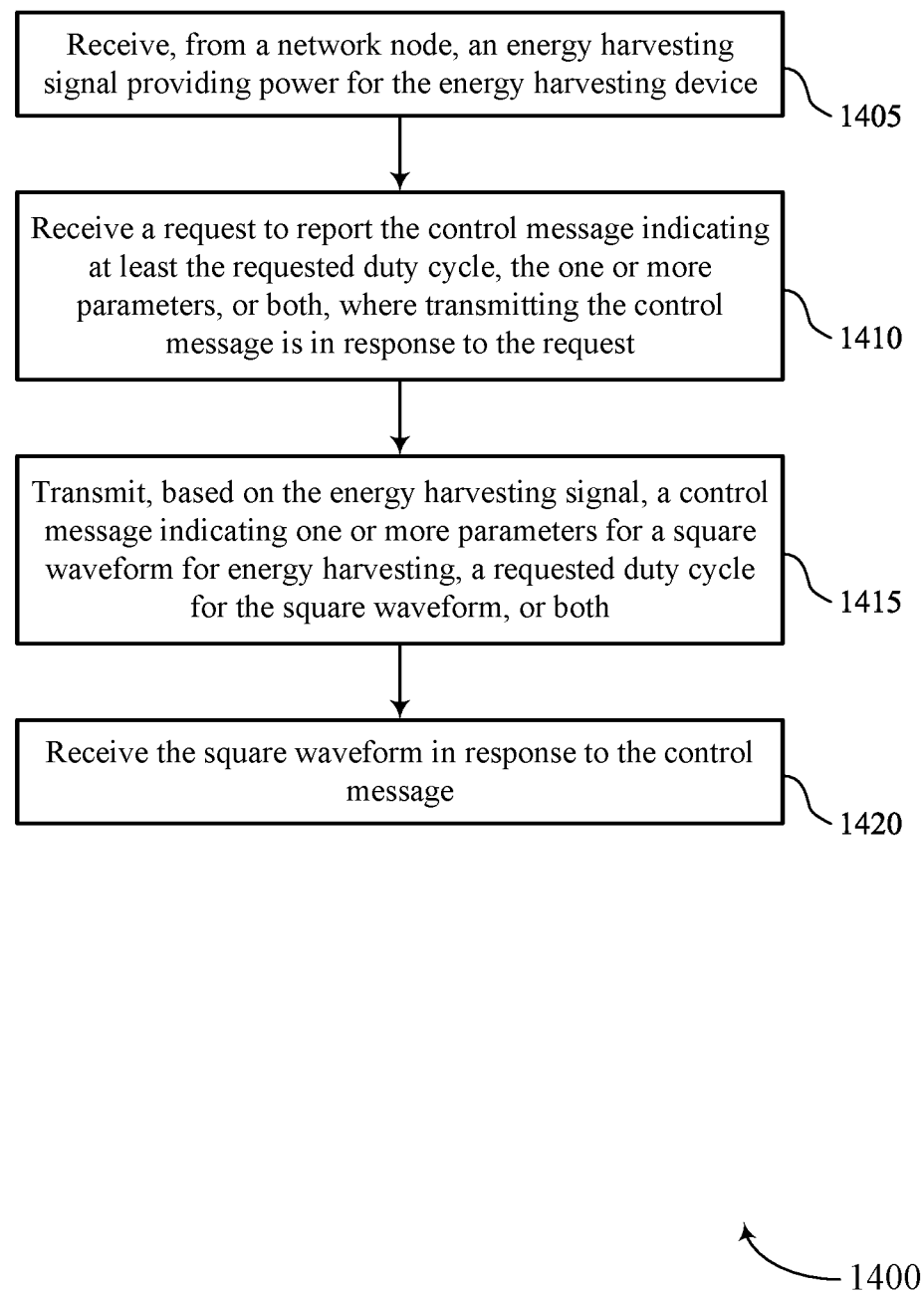

FIG. 14 illustrates a flowchart showing a method 1400 that supports techniques for energy harvesting using a square waveform in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving, from a network node, an energy harvesting signal providing power for the energy harvesting device. The operations of 1405 may be performed in accordance with examples as disclosed herein. In some examples, aspects of the operations of 1405 may be performed by an energy harvesting signal reception component 725 as described with reference to FIG. 7.

At 1410, the method may include receiving a request to report the control message indicating at least the requested duty cycle, the one or more parameters, or both, where transmitting the control message is in response to the request. The operations of 1410 may be performed in accordance with examples as disclosed herein. In some examples, aspects of the operations of 1410 may be performed by a parameter request component 760 as described with reference to FIG. 7.

At 1415, the method may include transmitting, based on the energy harvesting signal, a control message indicating one or more parameters for a square waveform for energy harvesting, a requested duty cycle for the square waveform, or both. The operations of 1415 may be performed in accordance with examples as disclosed herein. In some examples, aspects of the operations of 1415 may be performed by a square waveform parameter indicating component 730 as described with reference to FIG. 7.

At 1420, the method may include receiving the square waveform in response to the control message. The operations of 1420 may be performed in accordance with examples as disclosed herein. In some examples, aspects of the operations of 1420 may be performed by a square waveform reception component 735 as described with reference to FIG. 7.

Figure 15:
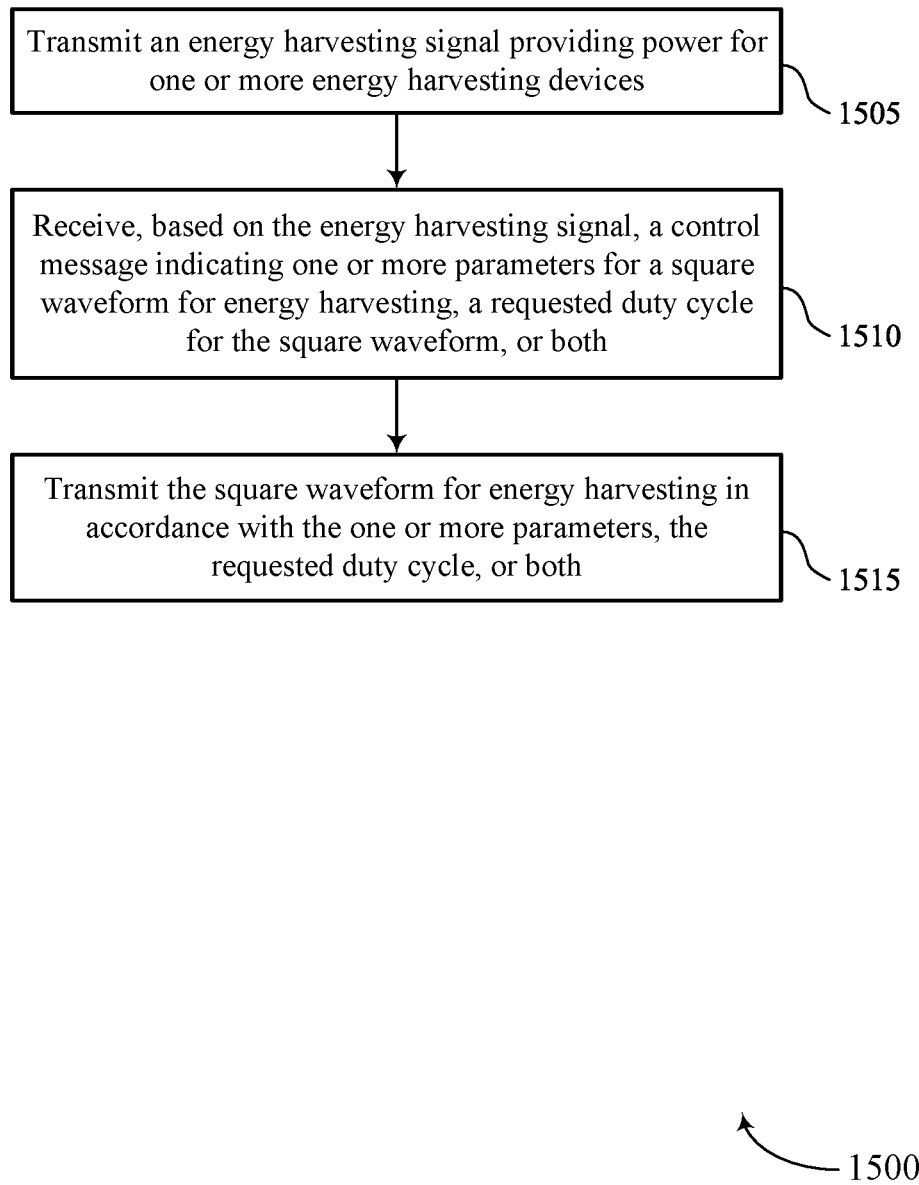

FIG. 15 illustrates a flowchart showing a method 1500 that supports techniques for energy harvesting using a square waveform in accordance with one or more aspects of the present disclosure. The operations of the method 1500 may be implemented by a UE or a network entity or its components as described herein. For example, the operations of the method 1500 may be performed by a UE 115 as described with reference to FIGS. 1 through 8 or a network entity as described with reference to FIGS. 1 through 4 and 9 through 12. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1505, the method may include transmitting an energy harvesting signal providing power for one or more energy harvesting devices. The operations of 1505 may be performed in accordance with examples as disclosed herein. In some examples, aspects of the operations of 1505 may be performed by an energy harvesting signal transmission component 740 or an energy harvesting signal transmission component 1125 as described with reference to FIGS. 7 and 11.

At 1510, the method may include receiving, based on the energy harvesting signal, a control message indicating one or more parameters for a square waveform for energy harvesting, a requested duty cycle for the square waveform, or both. The operations of 1510 may be performed in accordance with examples as disclosed herein. In some examples, aspects of the operations of 1510 may be performed by a square waveform parameter indication component 745 or a square waveform parameter indication component 1130 as described with reference to FIGS. 7 and 11.

At 1515, the method may include transmitting the square waveform for energy harvesting in accordance with the one or more parameters, the requested duty cycle, or both. The operations of 1515 may be performed in accordance with examples as disclosed herein. In some examples, aspects of the operations of 1515 may be performed by a square waveform transmission component 750 or a square waveform transmission component 1135 as described with reference to FIGS. 7 and 11.

Figure 16:
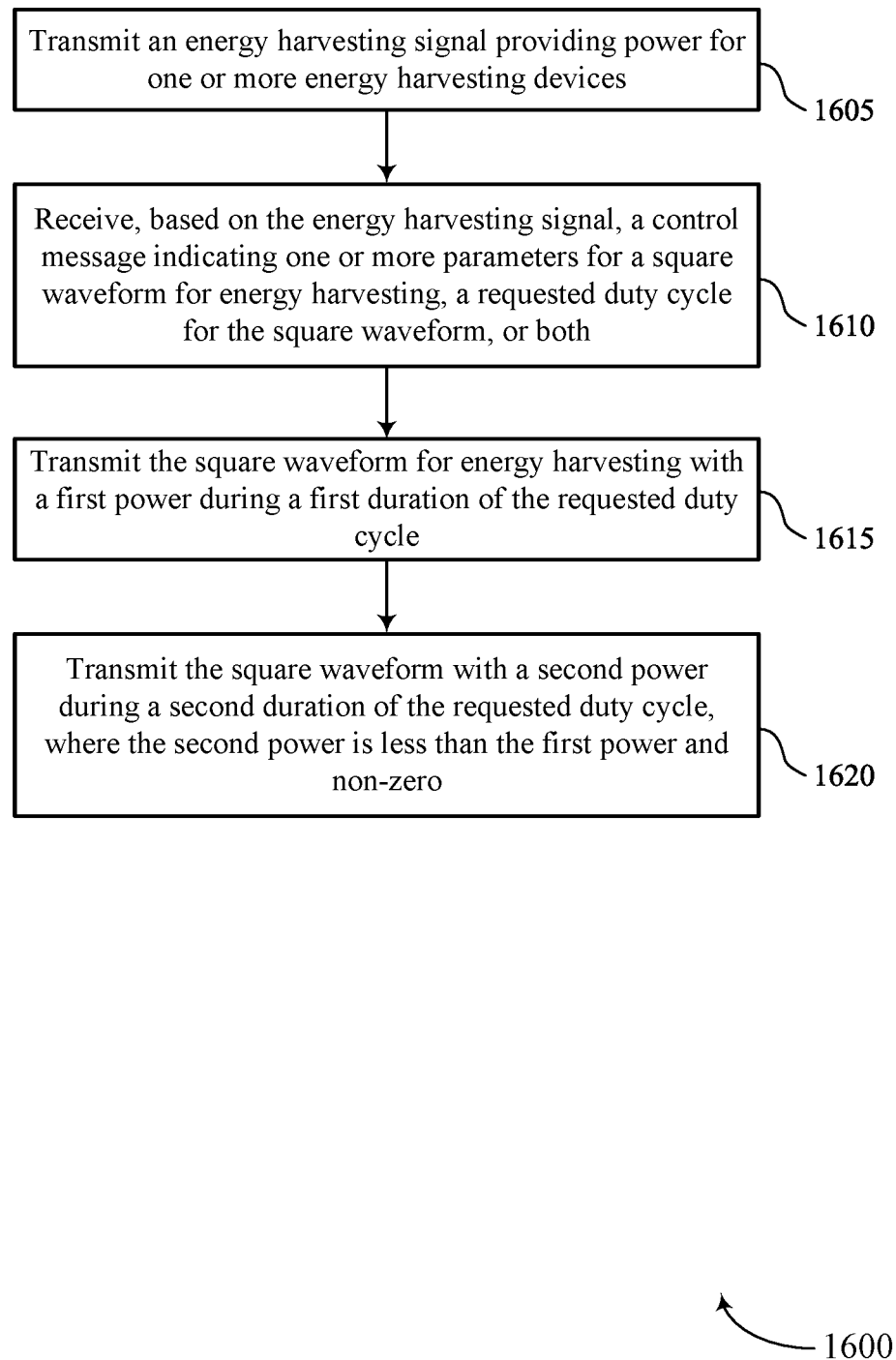

FIG. 16 illustrates a flowchart showing a method 1600 that supports techniques for energy harvesting using a square waveform in accordance with one or more aspects of the present disclosure. The operations of the method 1600 may be implemented by a UE or a network entity or its components as described herein. For example, the operations of the method 1600 may be performed by a UE 115 as described with reference to FIGS. 1 through 8 or a network entity as described with reference to FIGS. 1 through 4 and 9 through 12. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1605, the method may include transmitting an energy harvesting signal providing power for one or more energy harvesting devices. The operations of 1605 may be performed in accordance with examples as disclosed herein. In some examples, aspects of the operations of 1605 may be performed by an energy harvesting signal transmission component 740 or an energy harvesting signal transmission component 1125 as described with reference to FIGS. 7 and 11.

At 1610, the method may include receiving, based on the energy harvesting signal, a control message indicating one or more parameters for a square waveform for energy harvesting, a requested duty cycle for the square waveform, or both. The operations of 1610 may be performed in accordance with examples as disclosed herein. In some examples, aspects of the operations of 1610 may be performed by a square waveform parameter indication component 745 or a square waveform parameter indication component 1130 as described with reference to FIGS. 7 and 11.

At 1615, the method may include transmitting the square waveform for energy harvesting with a first power during a first duration of the requested duty cycle. The operations of 1615 may be performed in accordance with examples as disclosed herein. In some examples, aspects of the operations of 1615 may be performed by a square waveform transmission component 750 or a square waveform transmission component 1135 as described with reference to FIGS. 7 and 11.

At 1620, the method may include transmitting the square waveform with a second power during a second duration of the requested duty cycle, where the second power is less than the first power and non-zero. The operations of 1620 may be performed in accordance with examples as disclosed herein. In some examples, aspects of the operations of 1620 may be performed by a square waveform transmission component 750 or a square waveform transmission component 1135 as described with reference to FIGS. 7 and 11.

The following provides an overview of aspects of the present disclosure:

Aspect 1: A method for wireless communications at an energy harvesting device, comprising: receiving, from a network node, an energy harvesting signal providing power for the energy harvesting device; transmitting, based at least in part on the energy harvesting signal, a control message indicating one or more parameters for a square waveform for energy harvesting, a requested duty cycle for the square waveform, or both; and receiving the square waveform in response to the control message.

Aspect 2: The method of aspect 1, wherein transmitting the control message further comprises: transmitting the control message that indicates the one or more parameters that identify one or more sensitivity response curves for a plurality of different square waveforms, each square waveform of the plurality of different square waveforms having a respective duty cycle of a plurality of different duty cycles.

Aspect 3: The method of any of aspects 1 through 2, wherein transmitting the control message further comprises: transmitting the control message that indicates the one or more parameters that identify one or more sensitivity response curves for a plurality of different square waveforms, each square waveform of the plurality of different square waveforms associated with a respective input power level of a plurality of different input power levels.

Aspect 4: The method of any of aspects 1 through 3, wherein receiving the square waveform comprises: receiving the square waveform with a first power during a first duration of the requested duty cycle; and receiving the square waveform with a second power during a second duration the requested duty cycle, wherein the second power is less than the first power and non-zero.

Aspect 5: The method of aspect 4, wherein the requested duty cycle indicates the first duration and the second duration.

Aspect 6: The method of any of aspects 1 through 5, further comprising: receiving a request to report the control message indicating at least the requested duty cycle, the one or more parameters, or both, wherein transmitting the control message is in response to the request.

Aspect 7: The method of any of aspects 1 through 6, wherein the energy harvesting signal includes a request to report the requested duty cycle, the one or more parameters, or both, transmitting the control message is in response to the request.

Aspect 8: The method of any of aspects 1 through 7, wherein the one or more parameters indicate an average activation power of the energy harvesting device, the requested duty cycle for the square waveform associated with the average activation power of the energy harvesting device, a slope of sensitivity to duty cycle, a saturation duty cycle, one or more characteristics of a rectifier of the energy harvesting device, or any combination thereof.

Aspect 9: The method of any of aspects 1 through 8, wherein receiving the energy harvesting signal comprises: receiving a second square waveform in accordance with a second set of parameters, wherein transmitting the control message is based at least in part on receiving the second square waveform.

Aspect 10: The method of any of aspects 1 through 9, further comprising: transmitting, via backscattering, a packet including information in response to the square waveform.

Aspect 11: The method of any of aspects 1 through 10, wherein the control message indicates a set of parameters for each of one or more sensitivity response curves associated with a respective one or more square waveforms, each square waveform of the respective one or more square waveforms having a respective duty cycle or a respective input power level, or both.

Aspect 12: A method for wireless communications at a network node, comprising: transmitting an energy harvesting signal providing power for one or more energy harvesting devices; receiving, based at least in part on the energy harvesting signal, a control message indicating one or more parameters for a square waveform for energy harvesting, a requested duty cycle for the square waveform, or both; and transmitting the square waveform for energy harvesting in accordance with the one or more parameters, the requested duty cycle, or both.

Aspect 13: The method of aspect 12, wherein receiving the control message further comprises: receiving the control message that indicates the one or more parameters that identify one or more sensitivity response curves for a plurality of different square waveforms, each square waveform of the plurality of different square waveforms having a respective duty cycle of a plurality of different duty cycles.

Aspect 14: The method of any of aspects 12 through 13, wherein receiving the control message further comprises: receiving the control message that indicates the one or more parameters that identify one or more sensitivity response curves for a plurality of different square waveforms, each square waveform of the plurality of different square waveforms associated with a respective input power level of a plurality of different input power levels.

Aspect 15: The method of any of aspects 12 through 14, further comprising: transmitting a request for the control message indicating at least the requested duty cycle, the one or more parameters, or both, wherein the control message is in response to the request.

Aspect 16: The method of any of aspects 12 through 15, wherein transmitting the square waveform comprises: transmitting the square waveform with a first power during a first duration of the requested duty cycle; and transmitting the square waveform with a second power during a second duration of the requested duty cycle, wherein the second power is less than the first power and non-zero.

Aspect 17: The method of aspect 16, wherein the requested duty cycle indicates the first duration and the second duration.

Aspect 18: The method of any of aspects 12 through 17, wherein transmitting the square waveform comprises: transmitting the square waveform to a plurality of energy harvesting devices associated with a same group identifier or having requested common square waveform characteristics.

Aspect 19: The method of any of aspects 12 through 18, wherein the one or more parameters indicate an average activation power, the requested duty cycle for the square waveform associated with the average activation power, a slope of sensitivity to duty cycle, a saturation duty cycle, one or more characteristics of a rectifier, or any combination thereof.

Aspect 20: The method of any of aspects 12 through 19, wherein the energy harvesting signal indicates a request for the control message, the control message is in response to the request.

Aspect 21: The method of any of aspects 12 through 20, wherein the control message indicates a set of parameters for each of one or more sensitivity response curves associated with a respective one or more square waveforms, each square waveform of the respective one or more square waveforms having a respective duty cycle or a respective input power level, or both.

Aspect 22: An apparatus for wireless communications at an energy harvesting device, comprising a processor; memory coupled with the processor; and instructions stored in the memory and executable by the processor to cause the apparatus to perform a method of any of aspects 1 through 11.

Aspect 23: An apparatus for wireless communications at an energy harvesting device, comprising at least one means for performing a method of any of aspects 1 through 11.

Aspect 24: A non-transitory computer-readable medium storing code for wireless communications at an energy harvesting device, the code comprising instructions executable by a processor to perform a method of any of aspects 1 through 11.

Aspect 25: An apparatus for wireless communications at a network node, comprising a processor; memory coupled with the processor; and instructions stored in the memory and executable by the processor to cause the apparatus to perform a method of any of aspects 12 through 21.

Aspect 26: An apparatus for wireless communications at a network node, comprising at least one means for performing a method of any of aspects 12 through 21.

Aspect 27: A non-transitory computer-readable medium storing code for wireless communications at a network node, the code comprising instructions executable by a processor to perform a method of any of aspects 12 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at an energy harvesting device, comprising:
    a processor;
    memory coupled with the processor; and
    instructions stored in the memory and executable by the processor to cause the energy harvesting device to:
      receive, from an energy transfer device, an energy harvesting signal providing power for the energy harvesting device;
      transmit, based at least in part on the energy harvesting signal, a control message to the energy transfer device indicating one or more parameters for a square waveform for providing power for the energy harvesting device, a requested duty cycle for the square waveform, or both; and
      receive the square waveform from the energy transfer device in response to the control message.

2. The apparatus of claim 1, wherein the instructions are further executable by the processor to transmit the control message by being executable by the processor to:
    transmit the control message that indicates the one or more parameters that identify one or more sensitivity response curves for a plurality of different square waveforms, each square waveform of the plurality of different square waveforms having a respective duty cycle of a plurality of different duty cycles.

3. The apparatus of claim 1, wherein the instructions are further executable by the processor to transmit the control message by being executable by the processor to:
    transmit the control message that indicates the one or more parameters that identify one or more sensitivity response curves for a plurality of different square waveforms, each square waveform of the plurality of different square waveforms associated with a respective input power level of a plurality of different input power levels.

4. The apparatus of claim 1, wherein the instructions are further executable by the processor to receive the square waveform by being executable by the processor to:
    receive the square waveform with a first power during a first duration of the requested duty cycle; and
    receive the square waveform with a second power during a second duration the requested duty cycle, wherein the second power is less than the first power and non-zero.

5. The apparatus of claim 4, wherein the requested duty cycle indicates the first duration and the second duration.

6. The apparatus of claim 1, wherein the instructions are further executable by the processor to cause the energy harvesting device to:
    receive a request to report the control message indicating at least the requested duty cycle, the one or more parameters, or both, wherein transmitting the control message is in response to the request.

7. The apparatus of claim 1, wherein the energy harvesting signal includes a request to report the requested duty cycle, the one or more parameters, or both, the control message being transmitted in response to the request.

8. The apparatus of claim 1, wherein the one or more parameters indicate an average activation power of the energy harvesting device, the requested duty cycle for the square waveform associated with the average activation power of the energy harvesting device, a slope of sensitivity to duty cycle, a saturation duty cycle, one or more characteristics of a rectifier of the energy harvesting device, or any combination thereof.

9. The apparatus of claim 1, wherein the instructions are further executable by the processor to receive the energy harvesting signal by being executable by the processor to:
    receive a second square waveform in accordance with a second set of parameters, wherein transmitting the control message is based at least in part on receiving the second square waveform.

10. The apparatus of claim 1, wherein the instructions are further executable by the processor to cause the energy harvesting device to:
    transmit, via backscattering, a packet including information in response to the square waveform.

11. The apparatus of claim 1, wherein the control message indicates a set of parameters for each of one or more sensitivity response curves associated with a respective one or more square waveforms, each square waveform of the respective one or more square waveforms having a respective duty cycle or a respective input power level, or both.

12. An apparatus for wireless communications at an energy transfer device, comprising:
    a processor;
    memory coupled with the processor; and
    instructions stored in the memory and executable by the processor to cause the energy transfer device to:
      transmit an energy harvesting signal providing power for one or more energy harvesting devices;

receive, based at least in part on the energy harvesting signal, a control message from an energy harvesting device of the one or more energy harvesting devices indicating one or more parameters for a square waveform for providing power for the energy harvesting device, a requested duty cycle for the square waveform, or both; and transmit the square waveform to the energy harvesting device for energy harvesting in accordance with the one or more parameters, the requested duty cycle, or both.

13. The apparatus of claim 12, wherein the instructions are further executable by the processor to receive the control message by being executable by the processor to:

receive the control message that indicates the one or more parameters that identify one or more sensitivity response curves for a plurality of different square waveforms, each square waveform of the plurality of different square waveforms having a respective duty cycle of a plurality of different duty cycles.

14. The apparatus of claim 12, wherein the instructions are further executable by the processor to receive the control message by being executable by the processor to:

receive the control message that indicates the one or more parameters that identify one or more sensitivity response curves for a plurality of different square waveforms, each square waveform of the plurality of different square waveforms associated with a respective input power level of a plurality of different input power levels.

15. The apparatus of claim 12, wherein the instructions are further executable by the processor to cause the energy transfer device to:

transmit a request for the control message indicating at least the requested duty cycle, the one or more parameters, or both, wherein the control message is in response to the request.

16. The apparatus of claim 12, wherein the instructions are further executable by the processor to transmit the square waveform by being executable by the processor to:

transmit the square waveform with a first power during a first duration of the requested duty cycle; and transmit the square waveform with a second power during a second duration of the requested duty cycle, wherein the second power is less than the first power and non-zero.

17. The apparatus of claim 16, wherein the requested duty cycle indicates the first duration and the second duration.

18. The apparatus of claim 12, wherein the instructions are further executable by the processor to transmit the square waveform by being executable by the processor to:

transmit the square waveform to a plurality of energy harvesting devices associated with a same group identifier or having requested common square waveform characteristics.

19. The apparatus of claim 12, wherein the one or more parameters indicate an average activation power, the requested duty cycle for the square waveform associated with the average activation power, a slope of sensitivity to duty cycle, a saturation duty cycle, one or more characteristics of a rectifier, or any combination thereof.

20. The apparatus of claim 12, wherein the energy harvesting signal indicates a request for the control message, the control message being received in response to the request.

21. The apparatus of claim 12, wherein the control message indicates a set of parameters for each of one or more sensitivity response curves associated with a respective one or more square waveforms, each square waveform of the respective one or more square waveforms having a respective duty cycle or a respective input power level, or both.

22. A method for wireless communications at an energy harvesting device, comprising:

receiving, from an energy transfer device, an energy harvesting signal providing power for the energy harvesting device;

transmitting, based at least in part on the energy harvesting signal, a control message to the energy transfer device indicating one or more parameters for a square waveform for providing power for the energy harvesting device, a requested duty cycle for the square waveform, or both; and receiving the square waveform from the energy transfer device in response to the control message.

23. The method of claim 22, wherein transmitting the control message further comprises:

transmitting the control message that indicates the one or more parameters that identify one or more sensitivity response curves for a plurality of different square waveforms, each square waveform of the plurality of different square waveforms having a respective duty cycle of a plurality of different duty cycles.

24. The method of claim 22, wherein transmitting the control message further comprises:

transmitting the control message that indicates the one or more parameters that identify one or more sensitivity response curves for a plurality of different square waveforms, each square waveform of the plurality of different square waveforms associated with a respective input power level of a plurality of different input power levels.

25. The method of claim 22, wherein receiving the square waveform comprises:

receiving the square waveform with a first power during a first duration of the requested duty cycle; and receiving the square waveform with a second power during a second duration the requested duty cycle, wherein the second power is less than the first power and non-zero.

26. The method of claim 22, further comprising:

receiving a request to report the control message indicating at least the requested duty cycle, the one or more parameters, or both, wherein transmitting the control message is in response to the request.

27. The method of claim 22, wherein the one or more parameters indicate an average activation power of the energy harvesting device, the requested duty cycle for the square waveform associated with the average activation power of the energy harvesting device, a slope of sensitivity to duty cycle, a saturation duty cycle, one or more characteristics of a rectifier of the energy harvesting device, or any combination thereof.

28. The method of claim 22, wherein receiving the energy harvesting signal comprises:

receiving a second square waveform in accordance with a second set of parameters, wherein transmitting the control message is based at least in part on receiving the second square waveform.

29. The method of claim 22, further comprising:

transmitting, via backscattering, a packet including information in response to the square waveform.

30. A method for wireless communications at an energy transfer device, comprising:

transmitting an energy harvesting signal providing power for one or more energy harvesting devices;

receiving, based at least in part on the energy harvesting signal, a control message from an energy harvesting device of the one or more energy harvesting devices indicating one or more parameters for a square waveform for providing power for the energy harvesting device, a requested duty cycle for the square waveform, or both; and transmitting the square waveform to the energy harvesting device for energy harvesting in accordance with the one or more parameters, the requested duty cycle, or both.

* * * * *